(12) United States Patent
Nakamura et al.

(10) Patent No.: US 11,704,426 B1
(45) Date of Patent: Jul. 18, 2023

(54) INFORMATION PROCESSING SYSTEM AND INFORMATION PROCESSING METHOD

(71) Applicant: Hitachi, Ltd., Tokyo (JP)

(72) Inventors: Takaki Nakamura, Tokyo (JP);
Takahiro Yamamoto, Tokyo (JP);
Hideo Saito, Tokyo (JP); Keisuke Matsumoto, Tokyo (JP); Hiroto Ebara, Tokyo (JP); Naruki Kurata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/692,375

(22) Filed: Mar. 11, 2022

(30) Foreign Application Priority Data

Dec. 23, 2021 (JP) ................................. 2021-209498

(51) Int. Cl.
*G06F 21/62* (2013.01)
(52) U.S. Cl.
CPC ................................ *G06F 21/6218* (2013.01)
(58) Field of Classification Search
CPC .................................................. G06F 21/6218
See application file for complete search history.

(56) References Cited

U.S. PATENT DOCUMENTS

| | | | |
|---|---|---|---|
| 9,619,429 B1* | 4/2017 | Wang .................. | G06F 9/50 |
| 10,298,515 B1* | 5/2019 | Kirchhofer ......... | H04L 41/5051 |
| 10,536,518 B1* | 1/2020 | Streete ................ | H04L 41/12 |
| 10,713,092 B2* | 7/2020 | Gupta ................. | G06F 16/182 |
| 10,802,856 B1* | 10/2020 | Matatyaou .......... | G06F 9/45558 |
| 11,245,748 B1* | 2/2022 | Hannon ............... | H04L 67/10 |
| 11,412,962 B1* | 8/2022 | Miller .................. | A61B 5/4845 |
| 2015/0296016 A1* | 10/2015 | Bennett, Jr. ......... | H04L 67/1097 709/213 |
| 2015/0319250 A1* | 11/2015 | Vasudevan ......... | H04L 65/40 709/228 |
| 2016/0006668 A1* | 1/2016 | Shibayama .......... | G06F 3/0631 709/226 |
| 2016/0334998 A1* | 11/2016 | George ............... | G06F 3/0644 |
| 2016/0335118 A1* | 11/2016 | Beiter ................. | G06F 9/468 |
| 2016/0371145 A1 | 12/2016 | Akutsu et al. | |
| 2017/0289002 A1* | 10/2017 | Ganguli ............. | H04L 41/5051 |
| 2018/0011764 A1 | 1/2018 | Akutsu et al. | |
| 2018/0357127 A1 | 12/2018 | Akutsu et al. | |
| 2019/0187997 A1* | 6/2019 | Gupta ................ | G06F 9/3891 |

(Continued)

FOREIGN PATENT DOCUMENTS

JP       2020-144913 A       9/2020

*Primary Examiner* — Jason Chiang
(74) *Attorney, Agent, or Firm* — Volpe Koenig

(57) ABSTRACT

An object of the invention is to appropriately separate an available cluster for each user in a storage system configured by using a plurality of clusters each of which is an aggregate of nodes. A computer system includes a plurality of K8s clusters each configured by one or a plurality of K8s nodes, a storage that provides a volume, and a tenant management unit that manages the plurality of the K8s clusters and the storage. The tenant management unit creates, in the storage, a plurality of tenants respectively corresponding to the plurality of the K8s clusters. The storage, for each of the plurality of the K8s clusters, permits access from the K8s cluster to a tenant corresponding to the K8s cluster and prohibits access from the K8s cluster to a tenant not corresponding to the K8s cluster.

8 Claims, 30 Drawing Sheets

(56) References Cited

U.S. PATENT DOCUMENTS

| | | | |
|---|---|---|---|
| 2019/0235934 A1* | 8/2019 | Chanda | G06F 21/56 |
| 2019/0258521 A1* | 8/2019 | Takashige | G06F 3/0631 |
| 2020/0028911 A1* | 1/2020 | Sun | G06F 9/50 |
| 2020/0081781 A1 | 3/2020 | Akutsu et al. | |
| 2020/0136825 A1* | 4/2020 | Gupta | H04L 41/0895 |
| 2020/0186616 A1* | 6/2020 | Fitzer | G06F 8/61 |
| 2020/0225971 A1* | 7/2020 | Viswanathan | G06F 9/45558 |
| 2020/0387404 A1* | 12/2020 | Baxter | G06F 9/5072 |
| 2021/0240712 A1* | 8/2021 | Oscherov | G06F 16/24568 |
| 2021/0247905 A1* | 8/2021 | Chen | G06F 3/0647 |
| 2021/0271551 A1 | 9/2021 | Akutsu et al. | |
| 2022/0094690 A1* | 3/2022 | Tarkhanyan | H04L 63/123 |
| 2022/0103628 A1* | 3/2022 | Jagannati | H04L 69/22 |
| 2022/0156164 A1* | 5/2022 | Gunjikar | G06F 9/4881 |
| 2022/0159010 A1* | 5/2022 | Bandarupalli | G06F 21/31 |
| 2022/0210226 A1* | 6/2022 | Nijhawan | H04L 67/1097 |

\* cited by examiner

| TENANT AND MANAGER MANAGEMENT TABLE ||||
|---|---|---|---|
| 1101 | 1102 | 1103 | 1104 |
| TENANT ID | MANAGER ID | COMPUTING MANAGER ID | STORAGE MANAGER ID |
| 1 | 2 | 101 | 2 |
| 2 | 4 | 102 | 4 |
| 3 | 3 | 103 | 3 |
| 4 | 3 | 104 | 3 |
| 5 | 2 | 105 | 2 |
| 6 | 5 | 106 | 5 |
| 7 | 9 | 107 | 9 |
| 8 | 8 | 108 | 8 |
|   |   |   |   |

1110

| TENANT GROUP MANAGEMENT TABLE ||||
|---|---|---|---|
| 1111 | 1112 | 1113 | 1114 |
| TENANT GROUP ID | GROUP BELONGING TENANT ID | GROUP MANAGER ID | INTRA-GROUP PERMISSION ACTION |
| 1 | 1, 3, 6 | 2, 3, 5 | VOLUME READ |
| 2 | 2, 3 | 3, 4 | VOLUME READ/WRITE |
| 3 | 7, 8 | 8, 9 | All |
|   |   |   |   |

TENANT AND STORAGE TARGET PORT MANAGEMENT TABLE

| VIRTUAL TARGET PORT ID (1201) | TENANT ID (1202) | STORAGE TENANT ID (1203) | IP ADDRESS (1204) | TCP PORT NUMBER (1205) | TARGET NAME (1206) |
|---|---|---|---|---|---|
| 1 | 1 | 3 | 192.168.1.10 | 3260 | Xxxxx1 |
| 2 | 1 | 3 | 192.168.1.11 | 3260 | Xxxxx2 |
| 3 | 1 | 3 | 192.168.1.12 | 3260 | Xxxxx3 |
| 4 | 1 | 3 | 192.168.1.13 | 3260 | Xxxxx4 |
| 5 | 2 | 5 | 10.232.15.1 | 3260 | Yyyyy1 |
| 6 | 2 | 5 | 10.232.15.2 | 3260 | Yyyyy2 |
|   |   |   |   |   |   |

1210

TENANT AND STORAGE INITIATOR PORT MANAGEMENT TABLE

| INITIATOR PORT ID (1211) | TENANT ID (1212) | COMPUTING TENANT ID (1213) | IP ADDRESS (1214) | INITIATOR NAME (1215) |
|---|---|---|---|---|
| 1 | 1 | 1 | 192.168.2.10 | Ixxxx1 |
| 2 | 1 | 1 | 192.168.2.11 | Ixxxx2 |
| 3 | 1 | 1 | 192.168.2.12 | Ixxxx3 |
| 4 | 1 | 1 | 192.168.2.13 | Ixxxx4 |
| 5 | 2 | 2 | 10.232.16.1 | Iyyyy1 |
| 6 | 2 | 2 | 10.232.16.2 | Iyyyy2 |
|   |   |   |   |   |

FIG. 13

| STORAGE TENANT AND MANAGER MANAGEMENT TABLE 1300 ||
|---|---|
| STORAGE TENANT ID 1301 | STORAGE MANAGER ID 1302 |
| 3 | 2 |
| 5 | 4 |
|  |  |

| STORAGE TENANT AND RESOURCE MANAGEMENT TABLE 1310 |||
|---|---|---|
| STORAGE TENANT ID 1311 | STORAGE RESOURCE TYPE 1312 | RESOURCE ID 1313 |
| 1 | VIRTUAL TARGET PORT | 1 |
| 1 | VIRTUAL TARGET PORT | 2 |
| 1 | LU | 1 |
| 1 | LU | 2 |
| 1 | CAPACITY POOL | 1 |
| 2 | VIRTUAL TARGET PORT | 3 |
| 2 | LU | 3 |
| 2 | CAPACITY POOL | 2 |
|  |  |  |

INFORMATION PROCESSING SYSTEM AND INFORMATION PROCESSING METHOD

BACKGROUND OF THE INVENTION

1. Field of the Invention

The present invention relates to an information processing system and an information processing method.

2. Description of the Related Art

Regarding the invention, the following JP-A-2020-144913 (Patent Literature 1) is known. Patent Literature 1 describes a distributed storage system. In a plurality of nodes each including a storage device, a first node receives a plurality of pieces of user data together with a write request from a higher-level apparatus, generates a first redundant code based on the received plurality of pieces of user data, transmits the generated first redundant code and the plurality of pieces of user data to other nodes, and stores the plurality of pieces of user data in the storage device of the first node. A second node receives the user data and the first redundant code from a plurality of other nodes, generates a second redundant code based on the received user data and first redundant code, and stores the second redundant code in the storage device of the second node.

In recent years, a storage system realized on a container infrastructure has been used for a purpose of improving the agility and portability of services. Kubernetes (registered trademark, hereinafter abbreviated as "K8s") is widely known as one of orchestration tools used for constructing a container infrastructure. In a container environment using Kubernetes, a single node cluster (K8s cluster), which is an aggregate of nodes, can be shared by a plurality of users, which is more common than constructing individual K8s clusters for each user, user organization, and service.

Here, in a hyper-converged infrastructure (HCI) corresponding to the container infrastructure using Kubernetes described above, a plurality of K8s clusters are generally constructed in an HCI cluster. Specifically, a plurality of virtual machine (VMs) are created in the HCI cluster and these VMs are bundled to construct the K8s cluster. Although the HCI cluster can be constructed for each K8s cluster, a division loss occurs in this way, so that it is generally preferable to construct the HCI cluster as a single cluster. Therefore, a storage system used in the HCI corresponding to the container infrastructure needs to provide a volume of a predetermined capacity for each of the plurality of K8s clusters included in a single HCI cluster.

However, in the storage system described above, a volume being used in a certain K8s cluster may be browsed or operated from another K8s cluster. In such a case, not only an operation error of each user is induced, but also a risk in terms of security is caused.

SUMMARY OF THE INVENTION

Therefore, an object of the invention is to appropriately separate an available volume for each user in an information processing system including a plurality of node clusters each of which is an aggregate of nodes.

An information processing system according to the invention includes a processor and a storage device. The information processing system includes: a plurality of node clusters configured to execute a process; a storage configured to process data that the node cluster receives from or outputs to the storage device; and a management unit configured to manage the node cluster and the storage, and the plurality of node clusters, the storage, and the management unit operate on the processor. The management unit is configured to create a tenant and assign the node cluster and a resource of the storage to the tenant, and determine whether access from the node cluster to the storage is possible based on the tenant to which the resource of the storage and the node cluster are assigned and permit or prohibit the access.

An information processing method according to the invention includes: a processor operating as a plurality of node clusters configured to execute a process, a storage configured to process data that the node cluster receives from or outputs to the storage device, and a management unit configured to manage the node cluster and the storage; and the management unit creating a tenant and assigning the node cluster and a resource of the storage to the tenant, and determining whether access from the node cluster to the storage is possible based on the tenant to which the resource of the storage and the node cluster are assigned, and permitting or prohibiting the access.

According to the invention, an available volume can be appropriately separated for each user in the information processing system including a plurality of node clusters each of which is an aggregate of nodes.

BRIEF DESCRIPTION OF THE DRAWINGS

FIG. 11 is a diagram illustrating an example of a tenant and manager management table and a tenant group management table.

FIG. 12 is a diagram illustrating an example of a tenant and storage target port management table and a tenant and storage initiator port management table.

FIG. 13 is a diagram illustrating an example of a storage tenant and manager management table and a storage tenant and resource management table.

DESCRIPTION OF THE PREFERRED EMBODIMENTS

Hereinafter, embodiments of the invention will be described with reference to the drawings. For clarity of explanation, the following description and drawings may be omitted and simplified as appropriate. The invention is not limited to the present embodiment, and all application examples corresponding to ideas of the invention are included in a technical scope of the invention. Unless otherwise limited, each component may be either plural or singular.

In the following description, various types of information are described in an expression of "xxx table", and alternatively the various types of information may be expressed with a data structure other than the table. That is, the "xxx table" can be referred to as "xxx information" in order to indicate that the various types of information do not depend on a data structure.

In the following description, when the same kind of element is described without distinction, a reference sign (or a common part in the reference sign) is used, and when the same kind of element is separately described, ID of an element (or a reference sign of the element) may be used.

Hereinafter, an embodiment of the invention will be described.

First, various configuration examples of a computer system according to the embodiment of the invention will be described below with reference to FIGS. 1 to 5.

Figure 1:
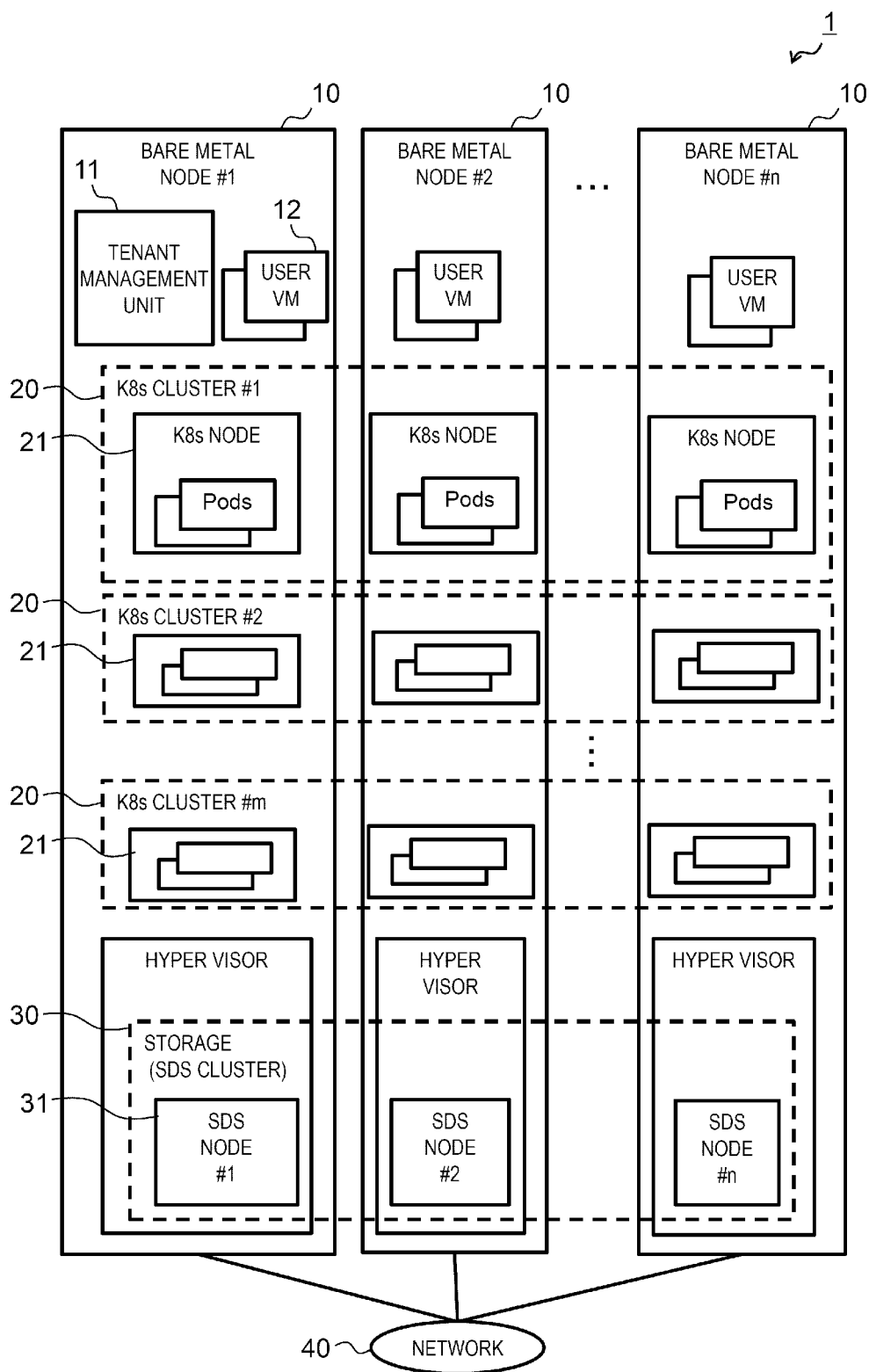
FIG. 1 is a diagram illustrating a first system configuration example of a computer system according to an embodiment of the invention.

FIG. 1 is a diagram illustrating a first system configuration example of the computer system according to the embodiment of the invention. FIG. 1 illustrates an example in which a plurality of bare metal nodes (physical machines) 10 are combined to configure an HCI cluster, and a computer system 1 according to the embodiment of the invention is implemented by the HCI cluster.

The computer system 1 illustrated in FIG. 1 includes n bare metal nodes 10 to which a series of numbers #1 to #n are assigned, respectively. Here, n is any natural number. Each bare metal node 10 includes a user virtual machine (VM) 12 implemented as a virtual machine, and a certain one of the bare metal nodes 10 includes a tenant management unit 11. In a system configuration of FIG. 1, the tenant management unit 11 is installed on the bare metal node #1, but the tenant management unit 11 may be installed on another bare metal node 10, or a plurality of bare metal nodes 10 may cooperate to realize a function of the tenant management unit 11. An SDS node 31 is a software-defined storage (SDS) operating on a hyper visor in each bare metal node 10. Therefore, in the system configuration of FIG. 1, n SDS nodes 31 the same number as that of the bare metal nodes operate. The SDS nodes 31 may be operated on a virtual machine or a container.

Each bare metal node 10 includes m K8s clusters 20 to which a series of numbers #1 to #m are assigned, respectively. Here, m is any natural number. Each K8s node 21 includes one or a plurality of pods. The pod represents an executing unit of an application provided by the computer system 1 and is configured by one or a plurality of containers. In the system configuration of FIG. 1, each K8s node 21 is implemented as a virtual machine in each bare metal node 10.

In the computer system 1, each bare metal node 10 is connected to each other via a network 40. The K8s node 21 and the SDS node 31 of each bare metal node 10 operate in coordination with each other to operate as a K8s cluster (node cluster) 20 and a storage (SDS cluster) 30. The storage 30, which is the SDS cluster, provides a volume to be a target for data that is received from or output to the K8s cluster 20 or the user VM 12. FIG. 1 illustrates an example in which m K8s clusters 20 and one storage 30 are constructed over all of the n bare metal nodes 10, but the invention is not limited thereto, and m K8s clusters 20 and one storage 30 may be constructed over a part of the bare metal nodes 10.

The tenant management unit 11 is a function block for managing tenants in the computer system 1, and is implemented by executing a predetermined program on the bare metal nodes 10. The storage 30 can provide, as a tenant, a predetermined volume for each user who uses the computer system 1 by the function of the tenant management unit 11. Details of the tenant management unit 11 will be described below.

Figure 2:
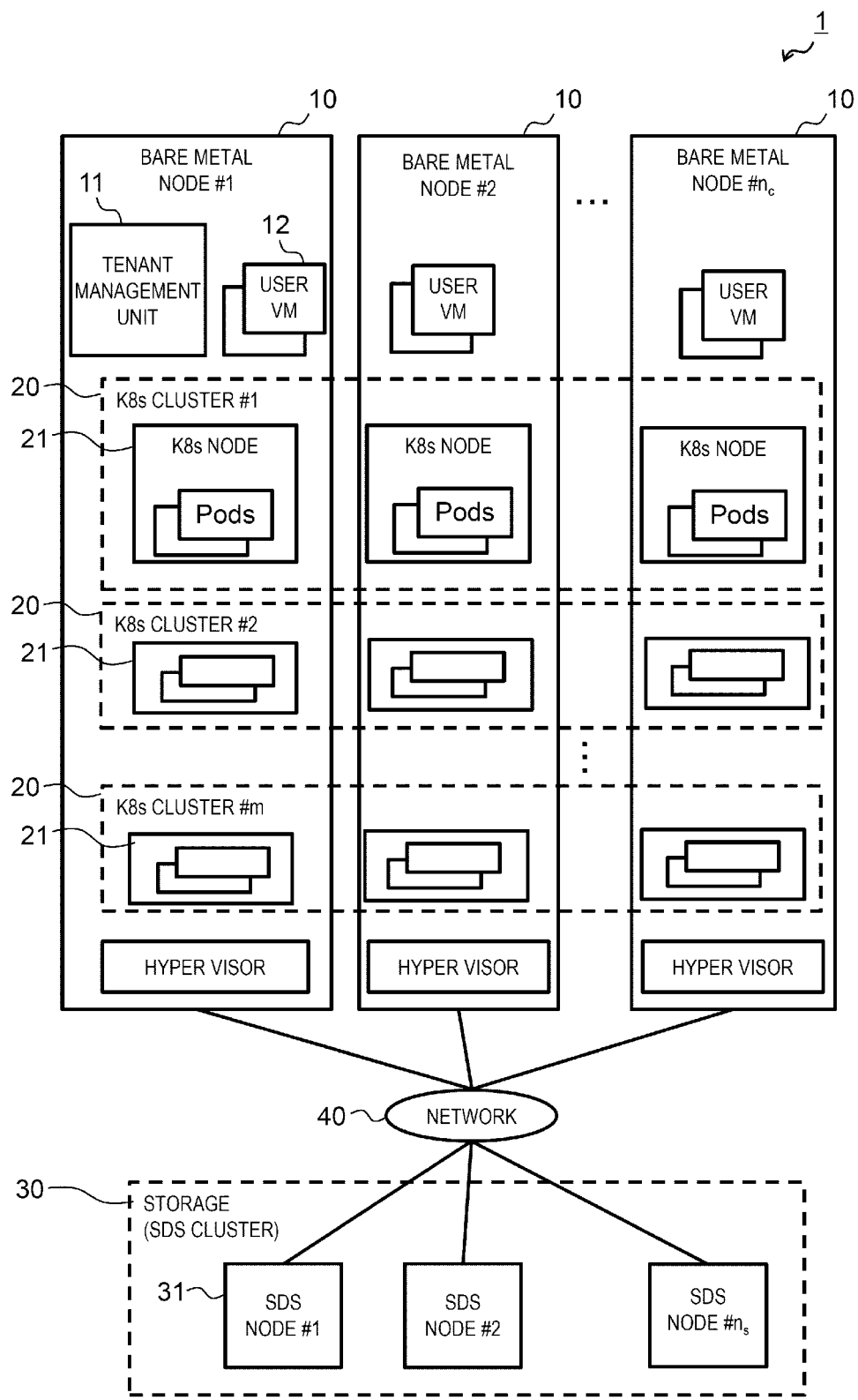
FIG. 2 is a diagram illustrating a second system configuration example of the computer system according to the embodiment of the invention.

FIG. 2 is a diagram illustrating a second system configuration example of the computer system according to the embodiment of the invention. FIG. 2 illustrates an example in which, separately from a computing cluster in which each of $n_c$ computers is combined as the bare metal node 10, $n_s$ SDS nodes 31 are combined to configure the storage (SDS cluster) 30, and the computing cluster and the storage 30 are connected to each other via the network 40, and thus computer system 1 according to the embodiment of the invention is provided. Here, $n_c$ and $n_s$ are any natural numbers, respectively.

In the system configuration example of FIG. 2, each K8s cluster 20 is constructed by coordinating the K8s nodes 21 of the respective bare metal nodes 10. On the other hand, by coordinating the SDS nodes 31 that are connected to each bare metal node 10 via the network 40, the storage 30, which is the SDS cluster, is constructed separately from the computing cluster.

Figure 3:
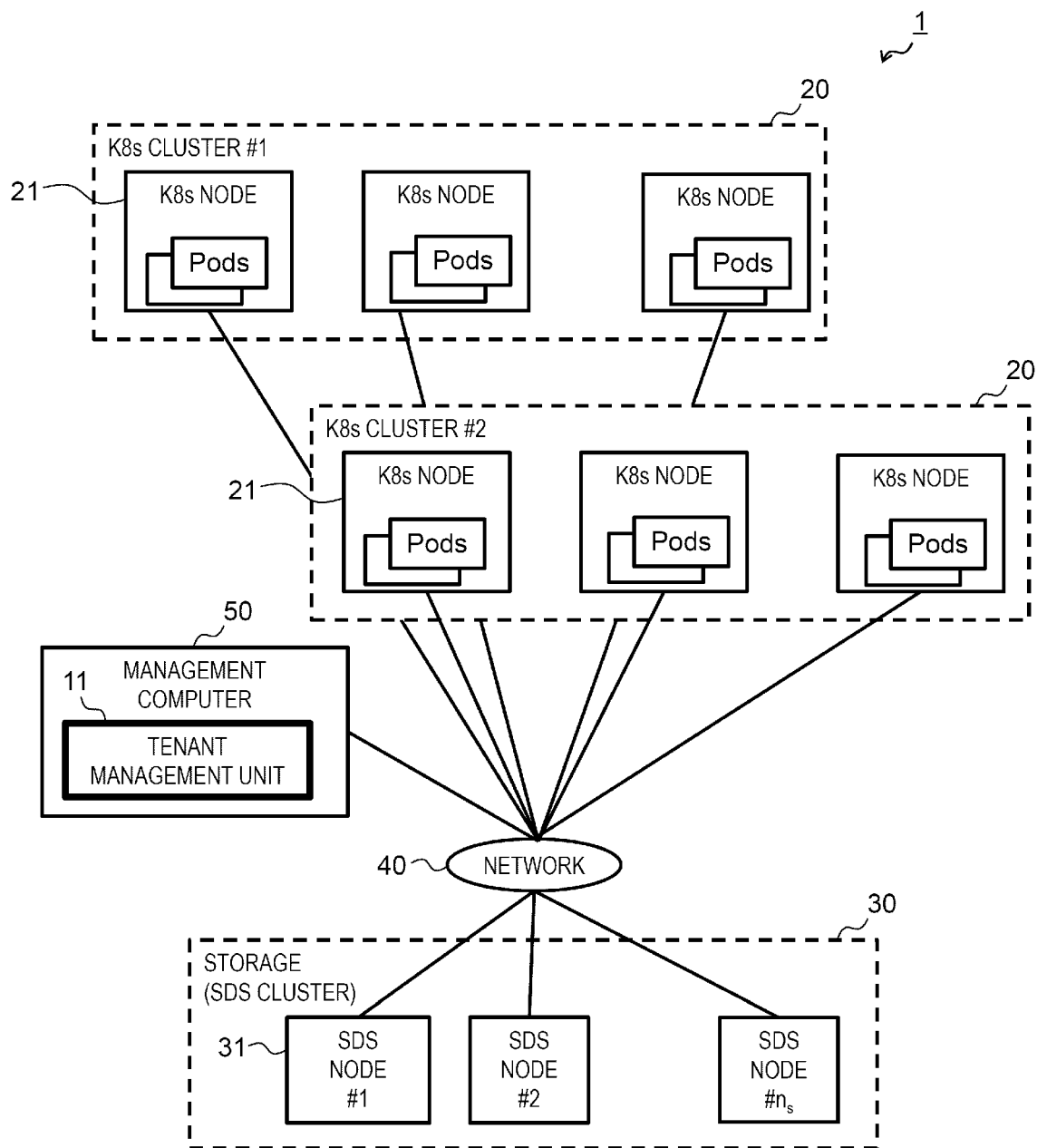
FIG. 3 is a diagram illustrating a third system configuration example of the computer system according to the embodiment of the invention.

FIG. 3 is a diagram illustrating a third system configuration example of the computer system according to the embodiment of the invention. In the system configuration example of FIG. 3, a plurality of the K8s nodes 21 that are configured by the respective bare metal nodes coordinate to construct the K8s clusters 20. In FIG. 3, two K8s clusters are constructed. The computer system 1 according to the embodiment of the invention is implemented by connecting, via the network 40, the K8s clusters 20, the storage (SDS cluster) 30 which is constructed by combining $n_s$ SDS nodes 31 as in FIG. 2, and a management computer 50 including the tenant management unit 11. The management computer 50 may be a physical machine or a virtual machine. The number of the K8s clusters 20 is not limited to two, and may be any number.

Figure 4:
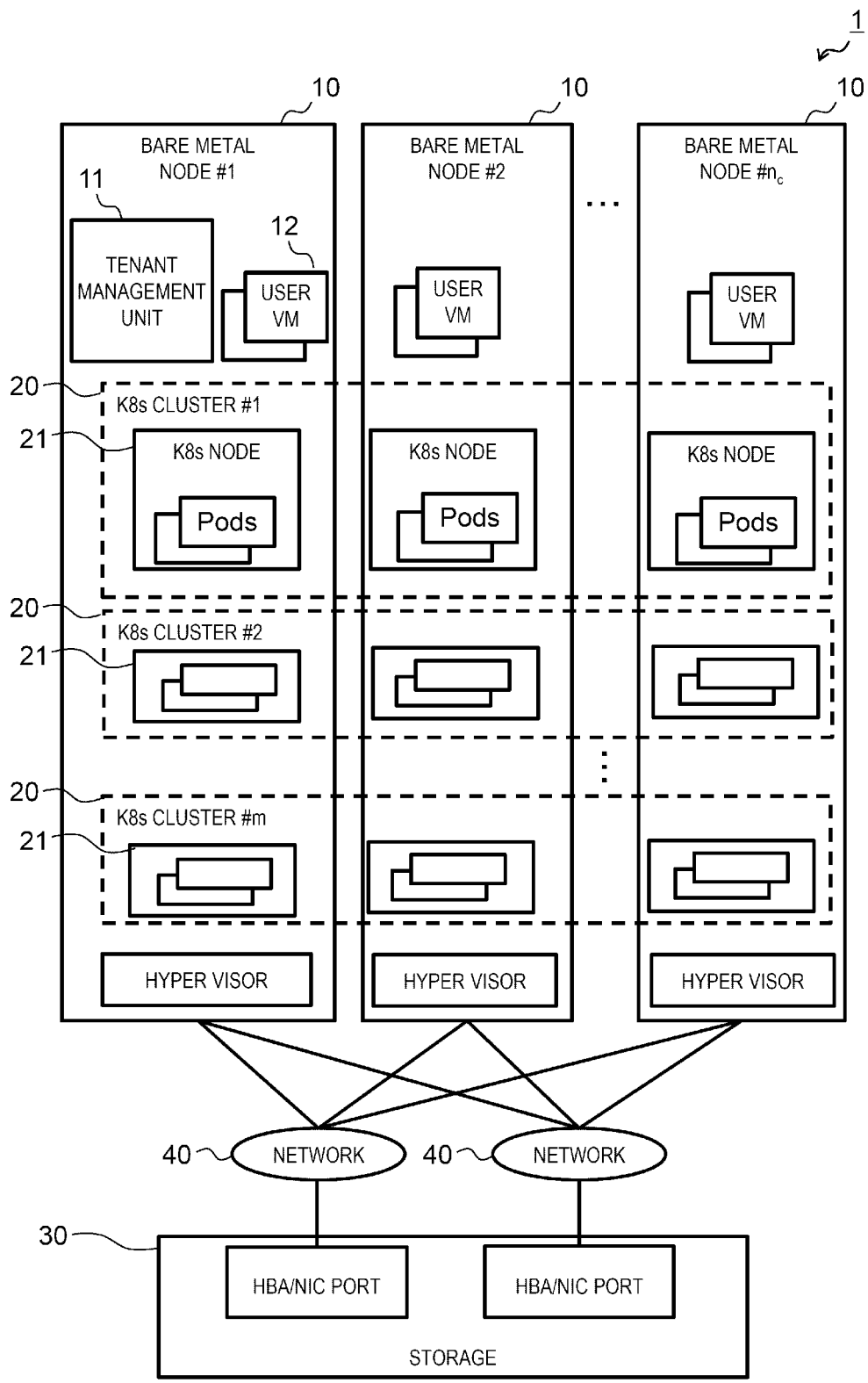
FIG. 4 is a diagram illustrating a fourth system configuration example of the computer system according to the embodiment of the invention.

FIG. 4 is a diagram illustrating a fourth system configuration example of the computer system according to the embodiment of the invention. In the system configuration example of FIG. 4, the computing cluster is formed by combining $n_c$ bare metal nodes 10, as in the system configuration example of FIG. 2. Each bare metal node 10 is connected to the storage 30 via the networks 40. The storage 30 is a storage array configured by combining a plurality of storage devices such as a HDD, a SSD, and the like, and the storage 30 is connected to the networks 40 via a plurality of host bus adapter (HBA) ports or network interface card (NIC) ports.

Figure 5:
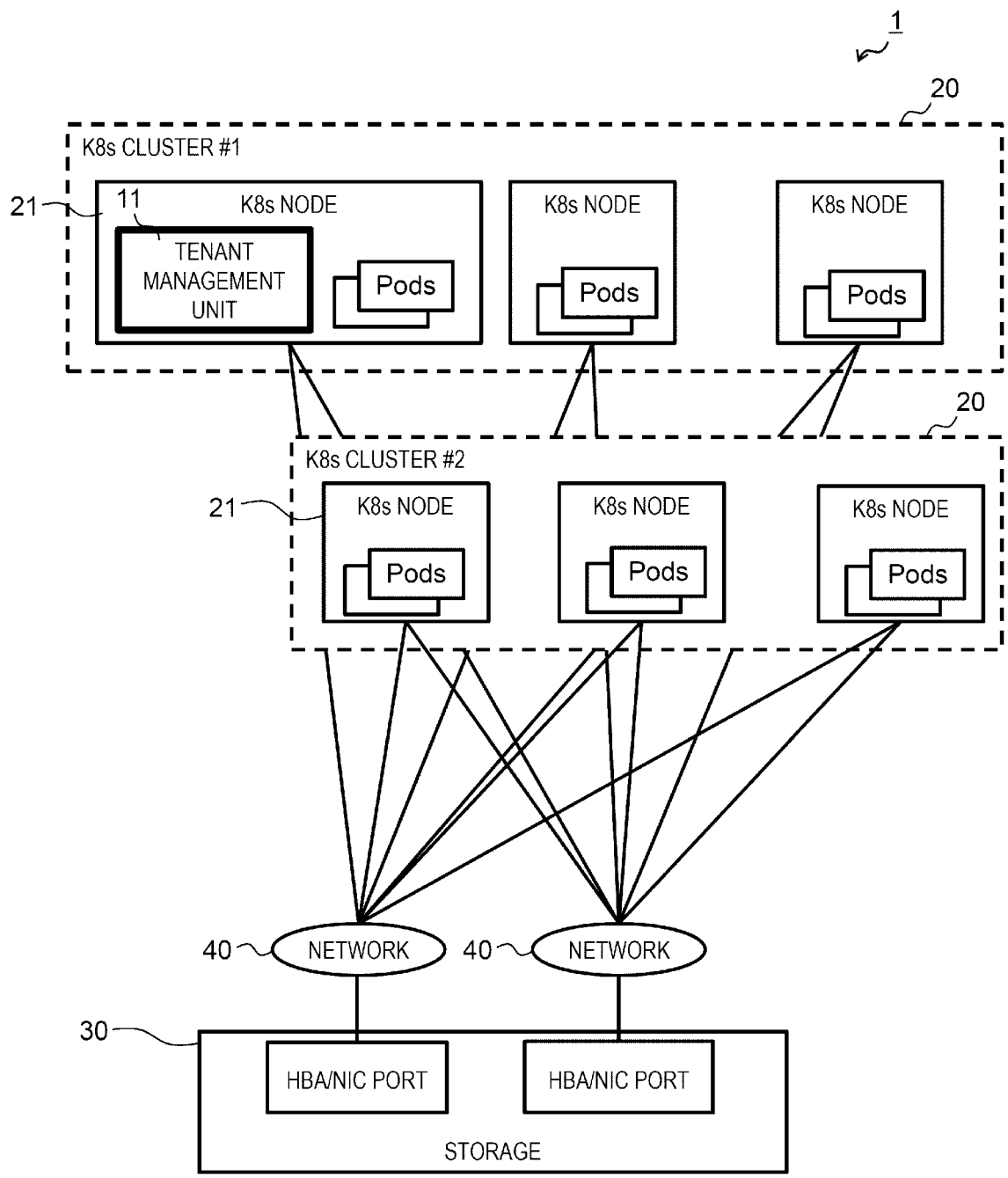
FIG. 5 is a diagram illustrating a fifth system configuration example of the computer system according to the embodiment of the invention.

FIG. 5 is a diagram illustrating a fifth system configuration example of the computer system according to the embodiment of the invention. In the system configuration example of FIG. 5, as in the system configuration example of FIG. 3, each of the K8s clusters 20 is constructed by combining a plurality of K8s nodes 21 that are respectively configured using the bare metal nodes which are physical machines to construct. In FIG. 5, two K8s clusters are constructed. Each K8s node 21 is connected to the storage 30 via the networks 40 as in FIG. 4. At least one of the K8s nodes 21 includes the tenant management unit 11.

Figure 6:
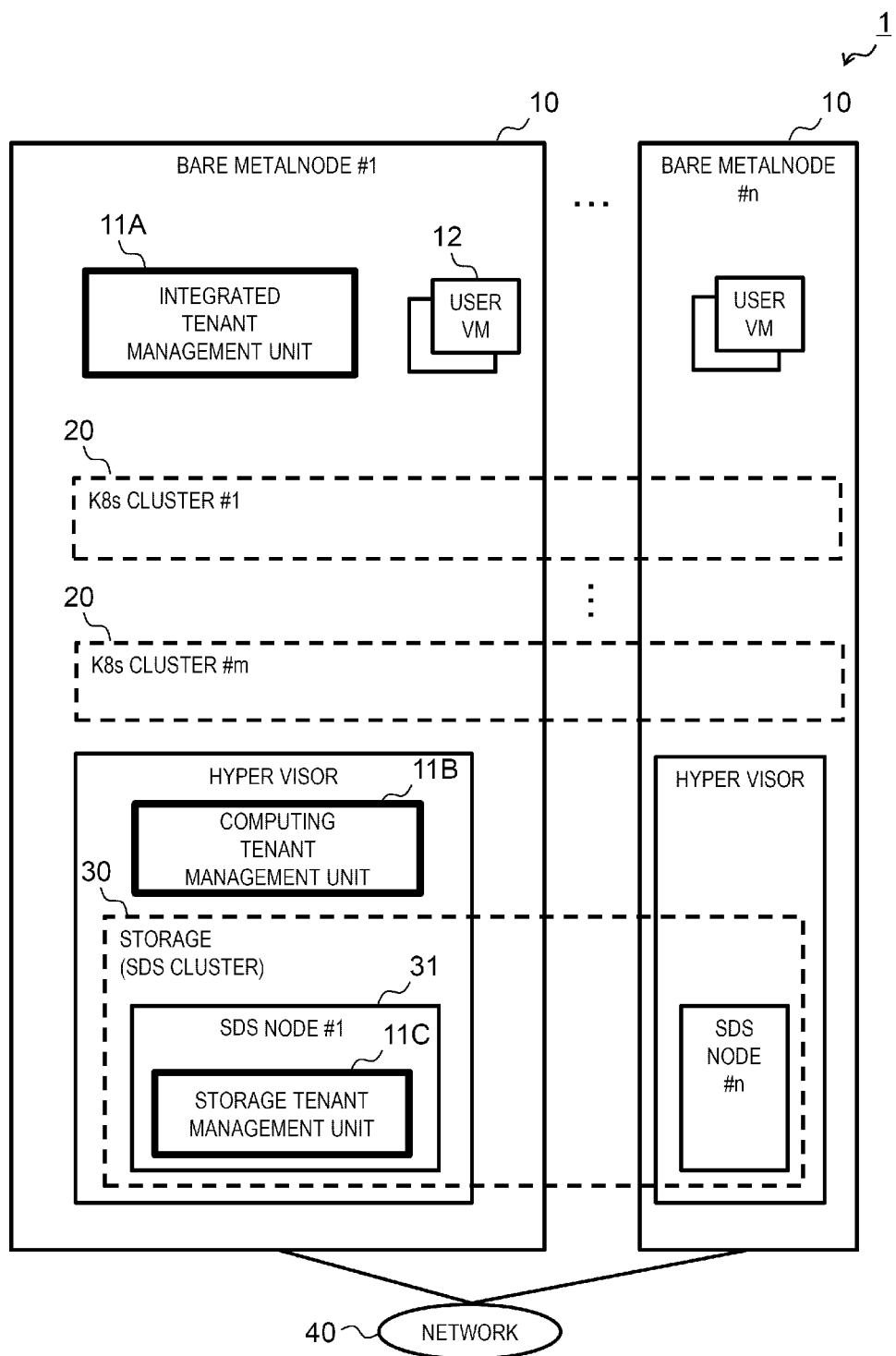
FIG. 6 is a diagram illustrating a configuration of a tenant management unit.

Next, a configuration of the tenant management unit in the computer system 1 will be described. In each of the first to fifth system configuration examples, the computer system 1 includes the tenant management unit 11. The tenant management unit 11 is configured by, for example, as illustrated in FIG. 6, an integrated tenant management unit 11A (the tenant management unit 11 in FIGS. 2 to 5), a computing tenant management unit 11B (not illustrated in FIGS. 2 to 5), and a storage tenant management unit 11C (not illustrated in FIGS. 2 to 5). FIG. 6 illustrates a configuration example of the tenant management unit 11 in the computer system 1 using the same HCI configuration as illustrated in FIG. 1, and the same applies to the other configuration examples described in FIGS. 2 to 5.

The integrated tenant management unit 11A performs tenant management for the entire computer system 1. The computing tenant management unit 11B performs the tenant management on a computing service part of the computer system 1, that is, each K8s cluster 20. The storage tenant management unit 11C performs the tenant management on a storage service part of the computer system 1, that is, the storage 30.

In the bare metal node 10, the integrated tenant management unit 11A may be implemented by a virtual machine or a container. Alternatively, as illustrated in the configuration example of FIG. 3 or FIG. 5, the integrated tenant management unit 11A may be implemented by using an independent physical machine. The computing tenant management unit 11B and the storage tenant management unit 11C are not essential components in the computer system 1. That is, the tenant management unit 11 may be configured by the integrated tenant management unit 11A alone.

Figure 7:
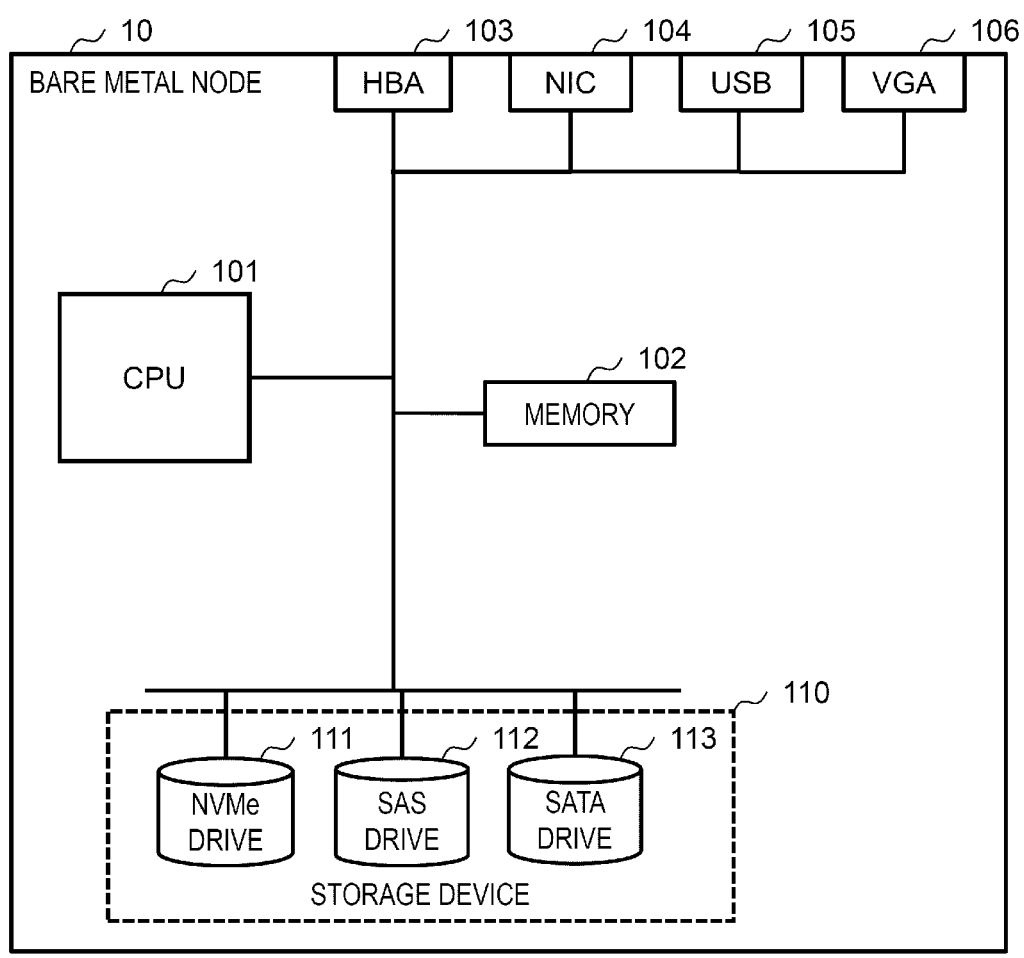
FIG. 7 is a hardware configuration diagram of each bare metal node in the computer system according to the embodiment of the invention.

FIG. 7 is a hardware configuration diagram of each bare metal node 10 in the computer system 1 according to the embodiment of the invention. Each bare metal node 10 that configures the computer system 1 of the present embodiment is configured by, for example, a computer such as a general-purpose PC or a server, and includes a central processing unit (CPU) 101, a memory 102, an HBA 103, an NIC 104, a universal serial bus (USB) 105, a video graphic array (VGA) 106, and a storage device 110. These components are connected by an internal bus or an external bus.

The CPU 101 manages and controls the storage device 110 while functions as the tenant management unit 11, the user VM 12, and the K8s node 21 by executing various programs stored in the memory 102. The memory 102 includes various tables stored therein. Data stored in the tables is referred to and updated as necessary when the programs are executed. Details of the tables and the programs stored in the memory 102 will be described later.

The HBA 103, the NIC 104, the USB 105 and the VGA 106 each perform an interface process of data that is received from or output to a predetermined external device. In addition, the interface process with an external device may be performed using a device other than the above components.

The storage device 110 is a non-volatile recording medium capable of storing various types of data, and reads or writes data according to a command from the CPU 101. The storage device 110 is configured by combining, for example, a non-volatile memory express (NVMe) drive 111, a serial attached SCSI (SAS) drive 112, a serial ATA (SATA) drive 113, and the like. The storage device 110 does not need to include all of these drives, and may be configured by at least one of these drives.

FIG. 7 illustrates a hardware configuration of the bare metal node 10. Each K8s node 21 configured by a physical machine in the system configuration examples of FIGS. 3 and 5 and the management computer 50 in the system configuration example of FIG. 3 can also be implemented by the same hardware configuration as in FIG. 7. In addition, each SDS node 31 of the storage 30 in the system configuration examples of FIGS. 2 and 3 and the storage 30 of the system configuration examples of FIGS. 4 and 5 can also be implemented by the same hardware configuration as in FIG. 7.

Figure 8:
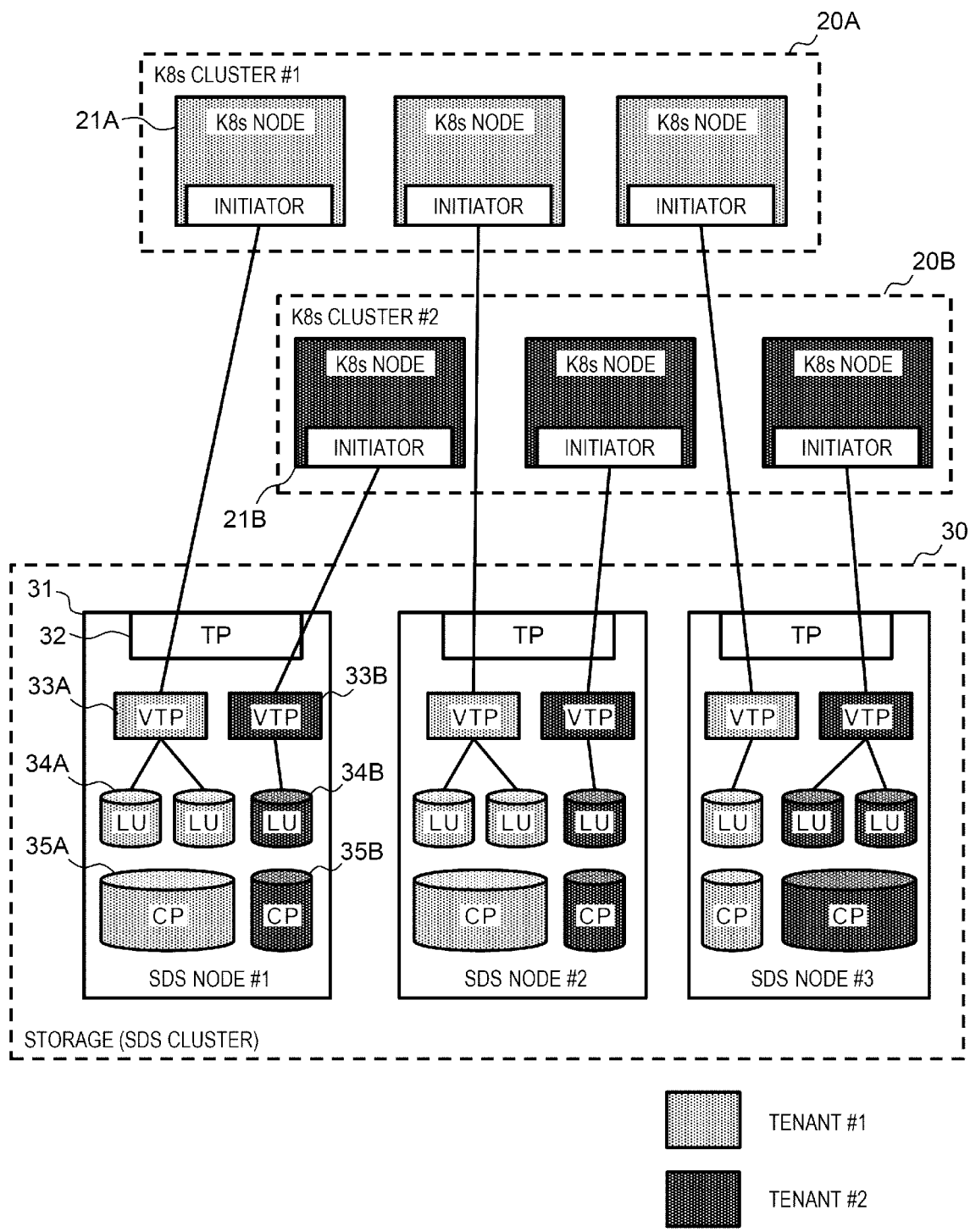
FIG. 8 is a diagram illustrating a management unit of a tenant in the computer system according to the embodiment of the invention.

Next, a management unit of a tenant in the computer system 1 will be described below with reference to FIG. 8. FIG. 8 is a diagram in which the physical configuration in FIGS. 1 to 5 are omitted and a logic configuration is illustrated. In the computer system 1, for example, as illustrated in FIG. 8, any two of the plurality of K8s clusters 20 are referred to as K8s clusters 20A and 20B, respectively. In the storage 30 which is the SDS cluster, each SDS node 31 includes a target port (TP) 32, virtual target ports (VTPs) 33A and 33B, logical units (LUs) 34A and 34B, capacity pools (CPs) 35A and 35B. The storage (SDS cluster) 30 causes a storage control program (not shown) to operate on a processor of each bare metal node. The storage control program is a program for processing data input or output in or from a storage device which is a physical storage device, and creates a CP which is a logic storage area and corresponds to a physical storage area of the storage device and an LU to which a part of the CP is allocated. The storage control program provides the K8s cluster 20 with a logical unit as a storage area that stores data. Data written from the K8s cluster 20 is stored in the LU by the storage control program, and is stored in the physical storage area of the storage device physically associated with the logical unit or the capacity pool. When the K8s cluster 20 reads out data, data is read out from the physical storage area of the storage device associated with the logical unit or the capacity pool. The TP is a physical port provided in the bare metal node, and serves as a logical VTP by assigning one or a plurality of virtual target port IDs thereto. When the bare metal node has one storage control program, it is possible to provide a plurality of VTPs, a plurality of LUs, a plurality of CPs, and a plurality of SDS nodes using resources of the bare metal node. In FIG. 8, the virtual target port 33A, the logical unit 34A, and the capacity pool 35A are provided corresponding to each K8s node 21A belonging to the K8s cluster 20A, and the virtual target port 33B, the logical unit 34B, and the capacity pool 35B are provided corresponding to each K8s node 21B belonging to the K8s cluster 20B.

In the computer system 1, in each SDS node 31 of the storage 30, the virtual target ports 33A and 33B are provided corresponding to the K8s clusters 20A and 20B, respectively, as described above. Each K8s node 21A of the K8s cluster 20A can access the logical unit 34A and the capacity pool 35A via the virtual target port 33A of the corresponding SDS node 31, and cannot access the logical unit 34B or the capacity pool 35B since access to the virtual target port 33B is prohibited. Similarly, each K8s node 21B of the K8s cluster 20B can access the logical unit 34B and the capacity pool 35B via the virtual target port 33B of the corresponding SDS node 31, and cannot access the logical unit 34A or the capacity pool 35A since access to the virtual target port 33A is prohibited.

In the computer system 1, the tenant management as described above is performed.

FIG. 8 illustrates an example of the tenant management in a case where the tenants are formed corresponding to two K8s clusters 20A and 20B, and storage services for the respective K8s clusters 20 can be provided as separate tenants by the same tenant management in a case where the tenants are formed corresponding to three or more K8s clusters 20. In the example of FIG. 8, one tenant is formed for each of the K8s clusters 20A and 20B, but a correspondence relation between the K8s clusters 20 and the tenant may not necessarily be one-to-one. That is, one tenant may be formed for a plurality of K8s clusters 20, or a plurality of tenants may be formed for one K8s cluster 20.

An example of the storage 30, which is the SDS cluster, has been illustrated in FIG. 8, and the storage 30 using the storage array can perform similar tenant management as in the system configuration example of FIG. 4 or FIG. 5.

Next, tables and programs in the computer system 1 of the present embodiment will be described below. In the computer system 1 of the present embodiment, various tables and programs are stored in the memory 102 as described above, and the function of the tenant management unit 11 is realized using these tables and programs. As a result, the tenant corresponding to each K8s cluster 20 is created in the storage 30 provided by the storage device 110, and access from each K8s cluster 20 to each tenant (volume) in the storage 30 is permitted or prohibited according to a correspondence relation between each K8s cluster 20 and each tenant.

Figure 9:
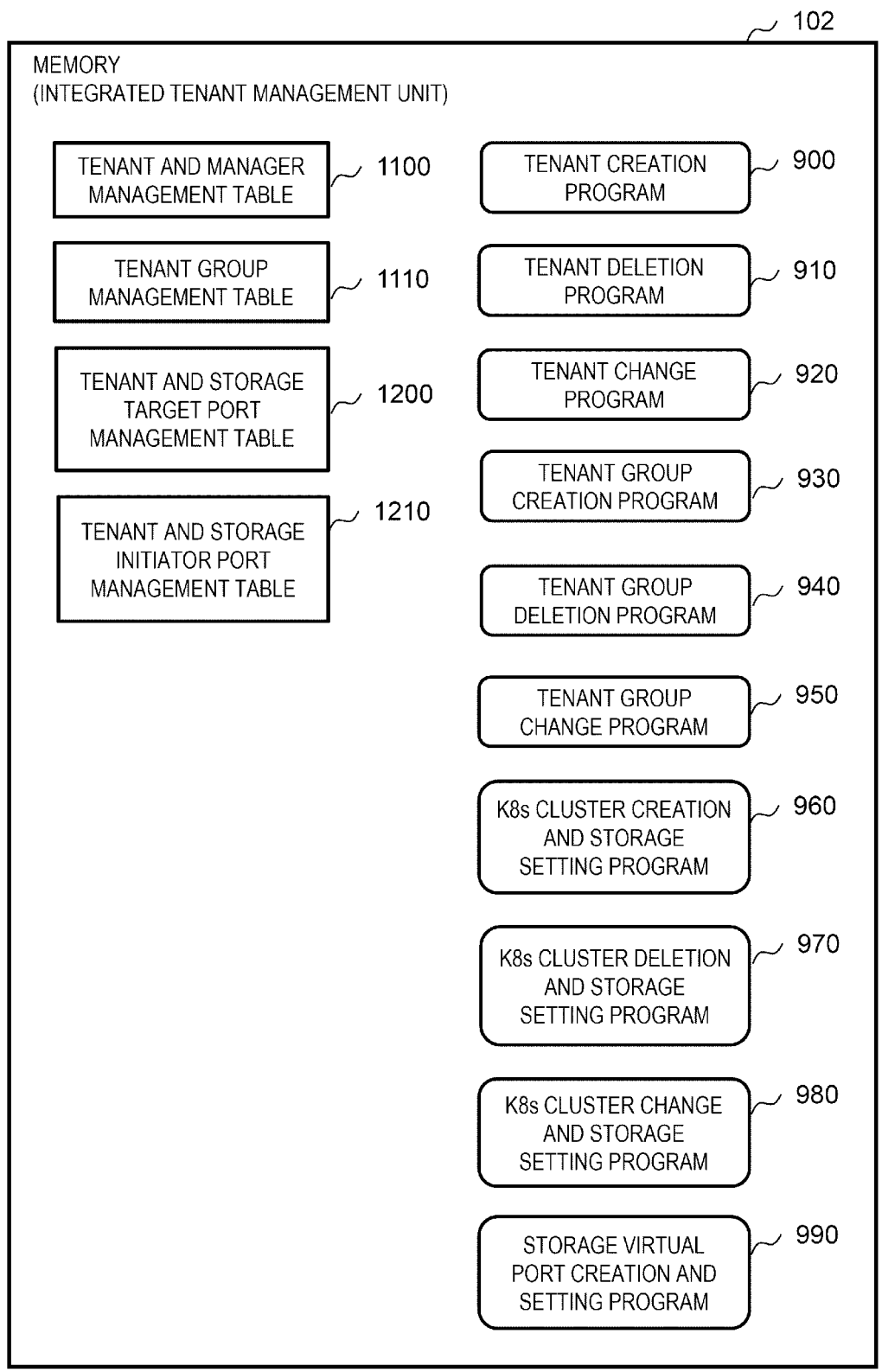
FIG. 9 is a diagram illustrating an example of tables and programs stored in a memory of an integrated tenant management unit.

FIG. 9 is a diagram illustrating an example of tables and programs used for realizing a function of the integrated tenant management unit 11A in the tenant management unit 11. As illustrated in FIG. 9, the memory 102 corresponding to the integrated tenant management unit 11A stores various tables including a tenant and manager management table 1100, a tenant group management table 1110, a tenant and storage target port management table 1200, and a tenant and storage initiator port management table 1210, and various programs including a tenant creation program 900, a tenant deletion program 910, a tenant change program 920, a tenant group creation program 930, a tenant group deletion program 940, a tenant group change program 950, a K8s cluster creation and storage setting program 960, a K8s cluster deletion and storage setting program 970, a K8s cluster change and storage setting program 980, and a storage virtual port creation and setting program 990.

The tenant and manager management table 1100 is a table representing a correspondence relation between the tenant and a manager. The tenant group management table 1110 is a table representing a correspondence relation among a tenant group set by grouping a plurality of tenants, tenants belonging to the tenant group, the manager of the group, and an authority allowed in the group. The tenant and storage target port management table 1200 is a correspondence table of target ports belonging to the tenants. The tenant and storage initiator port management table 1210 is a correspondence table of initiator ports belonging to the tenants.

The tenant creation program 900 is a program for creating the tenants. The tenant deletion program 910 is a program for deleting the created tenants. The tenant change program 920 is a program for changing the created tenants. The tenant group creation program 930 is a program for creating the tenant group by grouping the tenants. The tenant group deletion program 940 is a program for deleting the created tenant group. The tenant group change program 950 is a program for changing the created tenant group. The K8s cluster creation and storage setting program 960 is a program for creating the K8s clusters 20 to set a connection with the storage 30. The K8s cluster deletion and storage setting program 970 is a program for deleting the created K8s clusters 20 to reset the connection with the storage 30. The K8s cluster change and storage setting program 980 is a program for changing the created K8s clusters 20 to reset the connection with the storage 30. The storage virtual port creation and setting program 990 is a program for creating and setting the virtual target port corresponding to the tenant in the storage 30. The CPU 101 can function as the integrated tenant management unit 11A by executing these programs and can create the tenant corresponding to each K8s cluster 20 in the storage 30 provided by the storage device 110.

Figure 10:
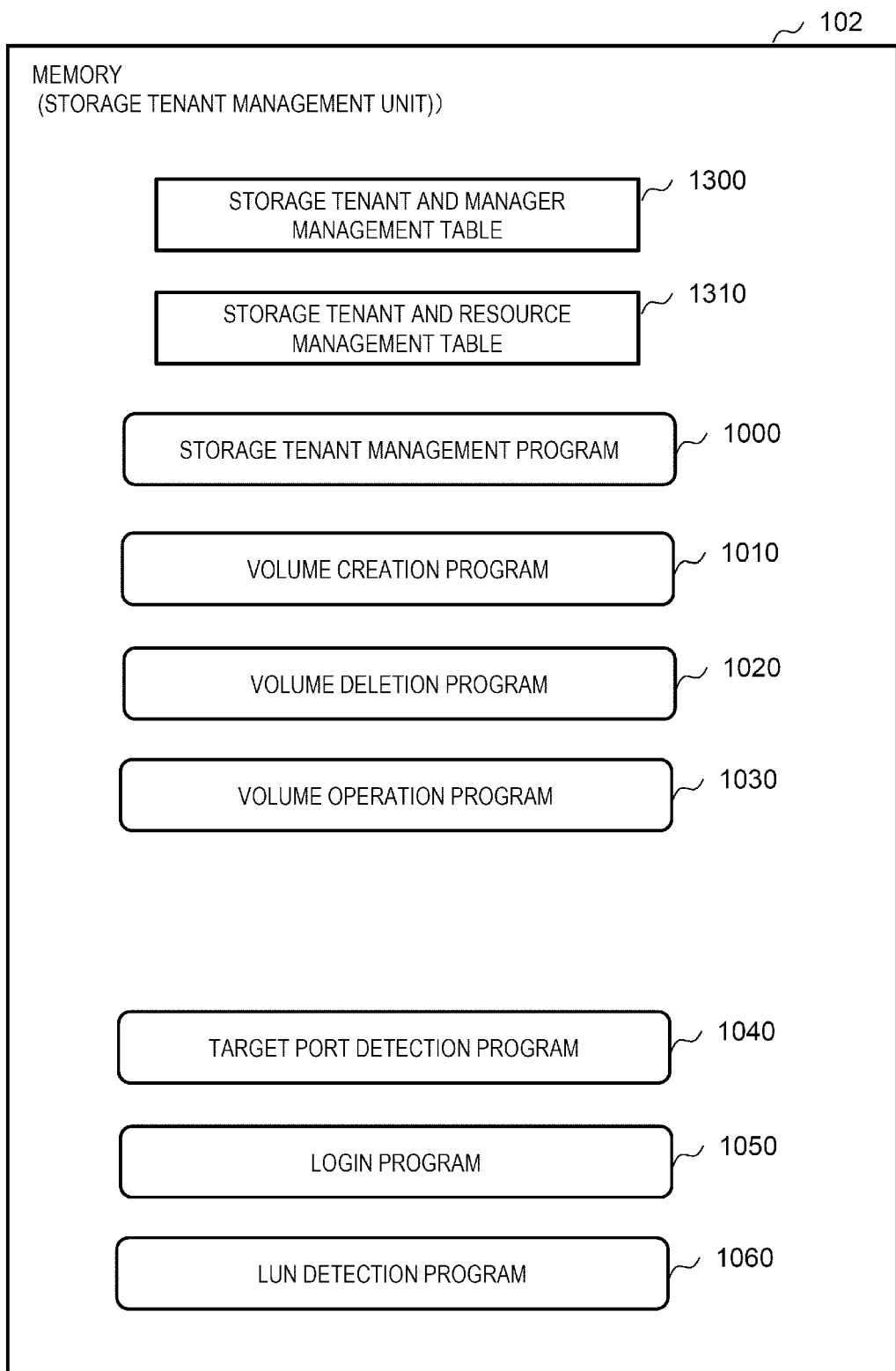
FIG. 10 is a diagram illustrating an example of tables and programs stored in a memory of a storage tenant management unit.

FIG. 10 is a diagram illustrating an example of tables and programs used for realizing a function of the storage tenant management unit 11C in the tenant management unit 11. As illustrated in FIG. 10, the memory 102 corresponding to the storage tenant management unit 11C stores various tables including a storage tenant and manager management table 1300 and a storage tenant and resource management table 1310, and various programs including a storage tenant management program 1000, a volume creation program 1010, a volume deletion program 1020, a volume operation program 1030, a target port detection program 1040, a login program 1050, and a LUN detection program 1060.

The storage tenant and manager management table 1300 is a table representing a correspondence relation between the tenant and the manager in the storage 30. The storage tenant and resource management table 1310 is a table representing a correspondence relation between the tenant and the resource in the storage 30.

The storage tenant management program 1000 is a program for managing the tenants in the storage 30. The volume creation program 1010 is a program for creating volumes in the storage 30. The volume deletion program 1020 is a program for deleting the created volumes from the storage 30. The volume operation program 1030 is a program for operating the volumes of the storage 30. The target port detection program 1040 is a program for detecting the target port corresponding to each tenant for each K8s cluster 20 in the storage 30. The login program 1050 is a program for permitting or prohibiting login to each target port of the storage 30 for each tenant. The LUN detection program 1060 is a program for detecting a logical unit number (LUN) of the storage 30 accessible from each K8s cluster 20. The CPU 101 can function as the storage tenant management unit 11C by executing these programs and can permit or prohibit access from each K8s cluster 20 to each tenant in the storage 30.

FIG. 11 is a diagram illustrating an example of the tenant and manager management table 1100 and the tenant group management table 1110.

In the tenant and manager management table 1100, records are set corresponding to the respective tenants set in the computer system 1. Each record includes information of a tenant ID 1101, a manager ID 1102, a computing manager ID 1103, and a storage manager ID 1104.

The tenant ID 1101 is an ID unique to each tenant and is used to uniquely identify each tenant. The manager ID 1102 is an ID unique to the manager set for each tenant and is used to uniquely identify each manager. The computing manager ID 1103 is a unique ID set for management of each tenant in a computing part (hyper visor or the like) of the computer system 1. The storage manager ID 1104 is a unique ID set for the management of each tenant in the storage 30. In a case where the manager ID is not individually defined for the computing part and the storage 30 in the computer system 1, for example, in a case where the computer system 1 has an HCI configuration and the like, the computing manager ID 1103 or the storage manager ID 1104 may be omitted.

In the tenant group management table 1110, records are set corresponding to the respective tenant groups set in the computer system 1. Each record includes information of a tenant group ID 1111, a group belonging tenant ID 1112, a group manager ID 1113, and an intra-group permission action 1114.

The tenant group ID 1111 is an ID unique to each tenant group and is used to uniquely identify each tenant group. The group belonging tenant ID 1112 represents an ID of the tenant belonging to each tenant group, and corresponds to the tenant ID 1101 of the tenant and manager management table 1100. The group manager ID 1113 represents the manager ID of the tenant belonging to each tenant group, and corresponds to the manager ID 1102 of the tenant and manager management table 1100. The intra-group permission action 1114 represents a content of an operation that the tenant belonging to each tenant group is permitted to perform on another tenant belonging to the same tenant group.

When a tenant creation instruction is issued, the CPU 101 adds the records into the tenant and manager management table 1100 and registers the information including the tenant ID 1101, the manager ID 1102, the computing manager ID 1103, and the storage manager ID 1104. When a tenant group creation instruction is issued, the CPU 101 adds the records to the tenant group management table 1110 and registers the information including the tenant group ID 1111, the group belonging tenant ID 1112, the group manager ID 1113, and the intra-group permission action 1114. Accordingly, the tenants and the tenant groups can be managed.

FIG. 12 is a diagram illustrating an example of the tenant and storage target port management table 1200 and the tenant and storage initiator port management table 1210.

In the tenant and storage target port management table 1200, records are set corresponding to the respective virtual target ports set in the storage 30. Each record includes information including a virtual target port ID 1201, a tenant ID 1202, a storage tenant ID 1203, an IP address 1204, a TCP port number 1205, and a target name 1206.

The virtual target port ID 1201 is an ID unique to each virtual target port and is used to uniquely identify each virtual target port. The tenant ID 1202 represents an ID of the tenant corresponding to each virtual target port and corresponds to the tenant ID 1101 of the tenant and manager management table 1100. The storage tenant ID 1203 represents the tenant ID of the storage 30 corresponding to each virtual target port and corresponds to a to-be-described storage tenant ID 1301 of the storage tenant and manager management table 1300. The IP address 1204 represents an IP address used for each virtual target port. The TCP port number 1205 represents a TCP port number used for each virtual target port. The target name 1206 represents a name set for each virtual target port.

In the tenant and storage initiator port management table 1210, records are set corresponding to the initiator port included in each K8s node 21 of the K8s cluster 20. Each record includes information including an initiator port ID 1211, a tenant ID 1212, a computing tenant ID 1213, an IP address 1214, and an initiator name 1215.

The initiator port ID 1211 is an ID unique to each initiator port and is used to uniquely identify each initiator port. The tenant ID 1212 represents an ID of the tenant corresponding to each initiator port and corresponds to the tenant ID 1101 of the tenant and manager management table 1100. The computing tenant ID 1213 represents a tenant ID of the computing part corresponding to each initiator port. The IP address 1214 represents an IP address used for each initiator port. The initiator name 1215 represents a name set for each initiator port.

When the virtual target port or the initiator port is set, the CPU 101 adds the records to the tenant and storage target port management table 1200 and the tenant and storage initiator port management table 1210 and registers each piece of information described above. As a result, the CPU 101 can manage a setting state of the virtual target port or the initiator port used for each tenant and a correspondence relation therebetween.

FIG. 13 is a diagram illustrating an example of the storage tenant and manager management table 1300 and the storage tenant and resource management table 1310.

In the storage tenant and manager management table 1300, records are set corresponding to the respective tenants set in the storage 30. Each record includes information including a storage tenant ID 1301 and a storage manager ID 1302.

The storage tenant ID 1301 represents an ID of each tenant in the storage 30. The storage manager ID 1302 represents an ID for management of each tenant in the storage 30 and corresponds to the storage manager ID 1104 of the tenant and manager management table 1100.

In the storage tenant and resource management table 1310, records are set corresponding to the respective tenants set in the storage 30. Each record includes information including a storage tenant ID 1311, a storage resource type 1312, and a resource ID 1313.

The storage tenant ID 1311 represents an ID of each tenant in the storage 30, and corresponds to the storage tenant ID 1301 of the storage tenant and manager management table 1300. The storage resource type 1312 represents a type of a storage resource included in each tenant in the storage 30. The resource ID 1313 represents an ID assigned to distinguish each resource when each tenant has a plurality of resources of the same type.

When the tenants are created in the storage 30, the CPU 101 adds the records to the storage tenant and manager management table 1300 and the storage tenant and resource management table 1310 and registers each piece of information described above. As a result, the tenant management can be performed on the storage 30. As described above, when the tenant management unit 11 does not include the storage tenant management unit 11C, the storage tenant and manager management table 1300 and the storage tenant and resource management table 1310 may be stored in the memory 102 corresponding to the integrated tenant management unit 11A.

Figure 14:
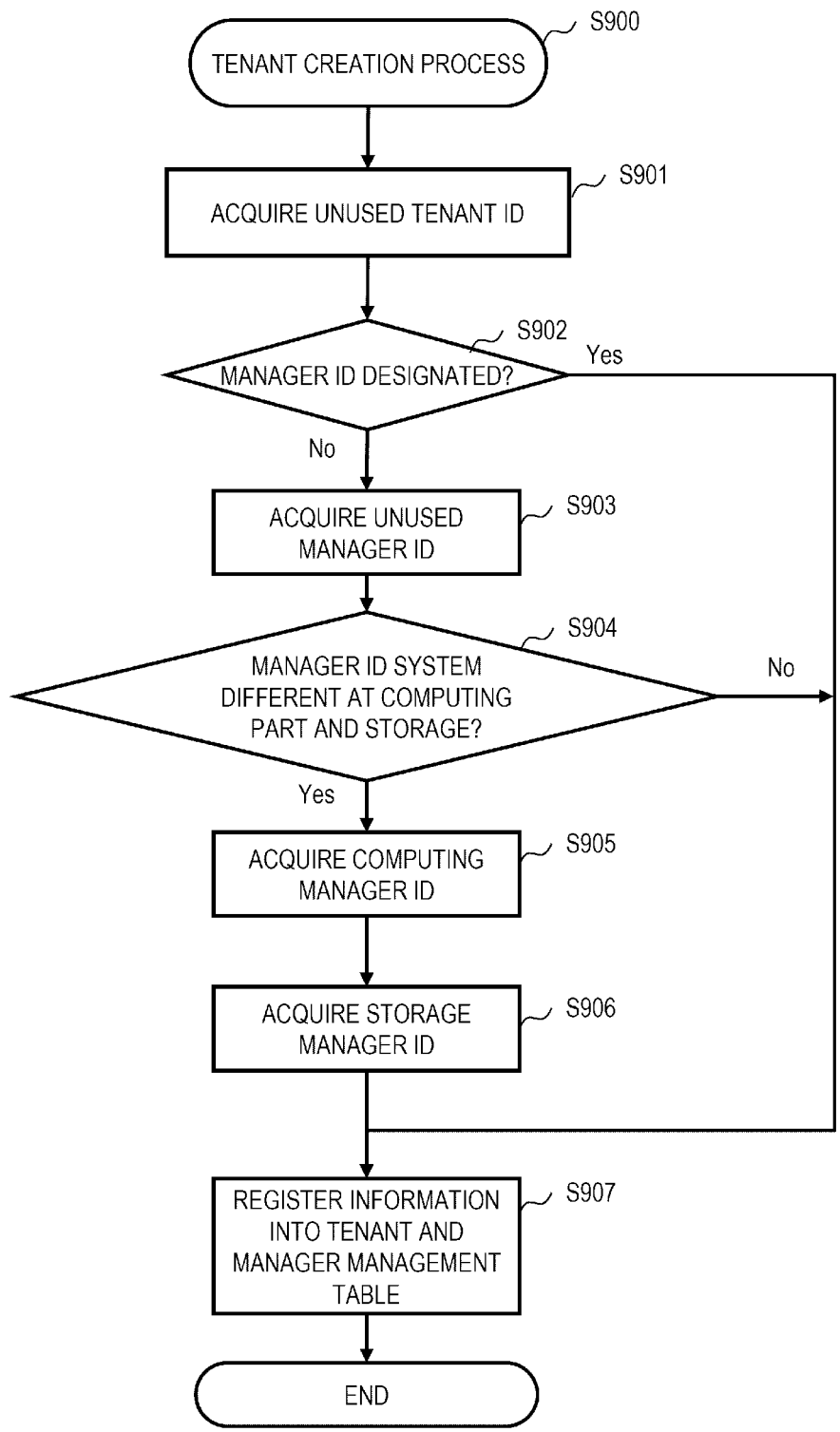
FIG. 14 is a flowchart of a tenant creation process.

FIG. 14 is a flowchart of a tenant creation process performed by the CPU 101 executing the tenant creation program 900.

When the tenant creation process is started in step S900, an unused tenant ID is acquired in step S901. Here, the unused tenant ID can be acquired by acquiring any ID that is not registered in the tenant ID 1101 in the tenant and manager management table 1100, for example, an ID having a smallest number among the unregistered IDs.

In step S902, it is determined whether the manager ID is designated for the tenant ID acquired in step S901. When the manager ID has been designated for the acquired tenant ID, the process proceeds to step S907. When the manager ID is not designated, the process proceeds to step S903.

In step S903, an unused manager ID is acquired. Here, the unused manager ID can be acquired by acquiring any ID that is not registered in a table (not shown) that manages the manager ID, for example, an ID having the smallest number among unregistered IDs.

In step S904, it is determined whether a manager ID system in the computer system 1 is different at the computing part and the storage. When the manager ID system is different at the computing part and the storage, the process proceeds to step S905. On the other hand, when the manager ID system is common at the computing part and the storage, the process proceeds to step S907.

In step S905, a computing manager ID designated in advance is acquired for the manager ID acquired in step S903.

In step S906, a storage manager ID designated in advance is acquired for the manager ID acquired in step S903.

In step S907, an entry is added to the tenant and manager management table 1100, and each piece of information acquired in steps S901 to S906 is registered. After the information is registered, the tenant creation process illustrated in the flowchart of FIG. 14 is ended.

The CPU 101 executes the tenant creation program 900 to perform the tenant creation process described above, and thus can function as the integrated tenant management unit 11A and can create, in the storage 30, a plurality of tenants corresponding to the plurality of K8s clusters 20.

Figure 15:
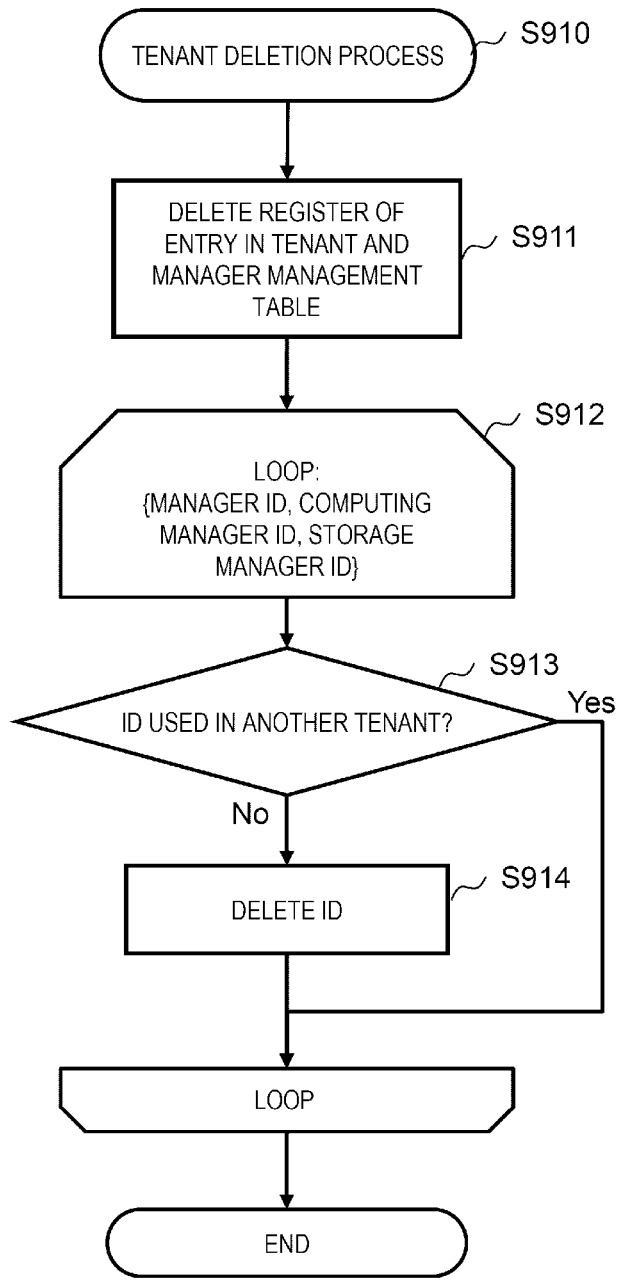
FIG. 15 is a flowchart of a tenant deletion process.

FIG. 15 is a flowchart of a tenant deletion process performed by the CPU 101 executing the tenant deletion program 910.

When the tenant deletion process is started in step S910, in step S911, registration of an entry corresponding to a tenant designated as a deletion target is deleted in the tenant and manager management table 1100.

In step S912, a loop process of steps S913 and S914 is performed on IDs registered in the manager ID 1102, the computing manager ID 1103, and the storage manager ID 1104 of the entry deleted in step S911.

In step S913, it is determined whether an ID to be processed is used in another tenant. When the ID is registered in an entry other than the entry deleted in step S911, it is determined that the ID is used in another tenant, and the process proceeds to a loop process for the next ID to be processed. On the other hand, when the ID is not registered in an entry other than the entry deleted in step S911, it is determined that the ID is not used in another tenant, and the process proceeds to step S914.

In step S914, the ID to be processed is deleted from a table (not shown) that manages each manager ID. After the process of step S914 is performed, the process proceeds to a loop process for the next ID to be processed.

After the loop process of steps S913 and S914 is performed for all the IDs to be processed, the tenant deletion process illustrated in the flowchart of FIG. 15 is ended.

The CPU 101 executes the tenant deletion program 910 to perform the tenant deletion process described above, and thus can function as the integrated tenant management unit 11A and can delete created tenant that is unnecessary from the storage 30.

In the tenant change program 920, an entry corresponding to a tenant to be changed is selected in the tenant and manager management table 1100 and a content of each piece of information of the entry is changed, and thus a tenant change can be performed. As a result, the CPU 101 can function as the integrated tenant management unit 11A and can change the created tenant to another tenant in the storage 30.

Figure 16:
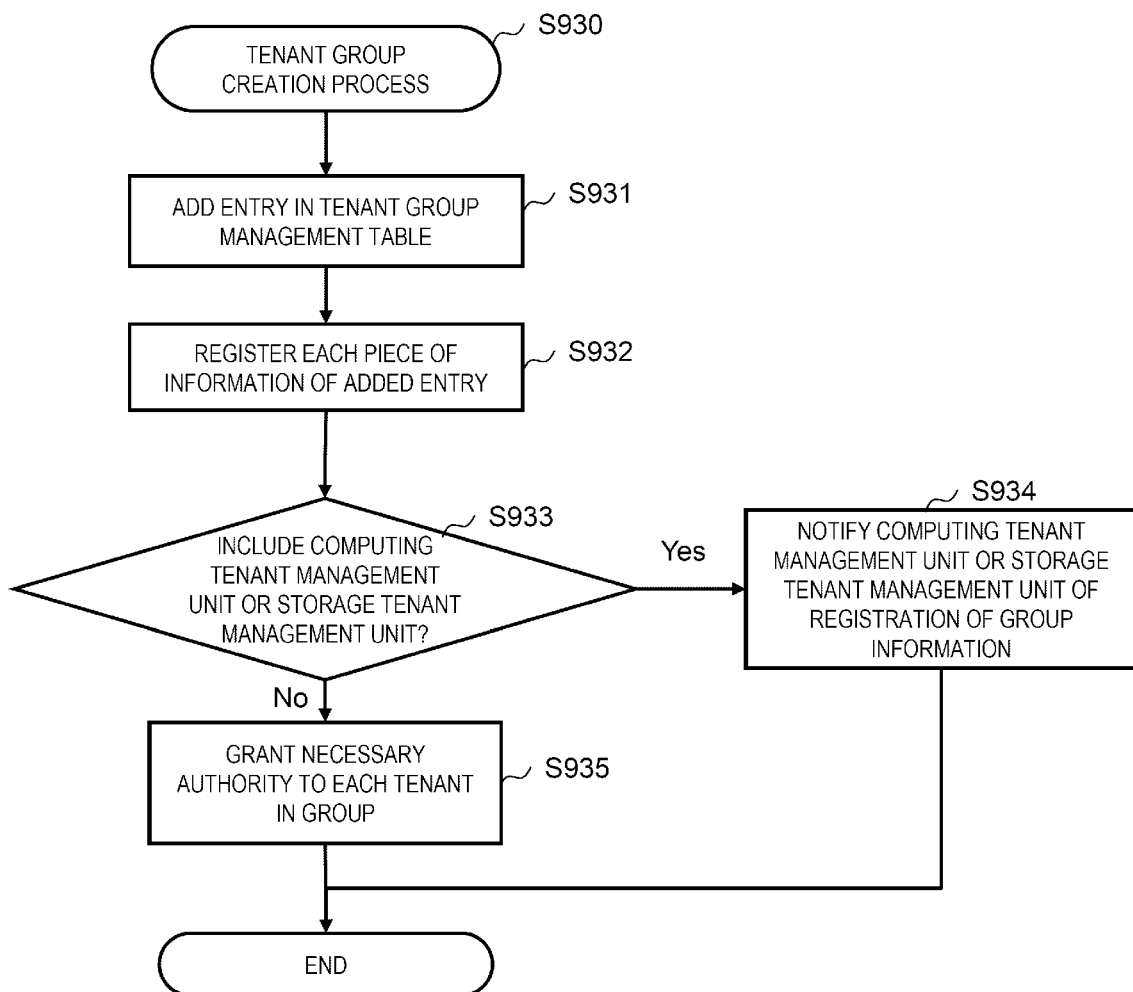
FIG. 16 is a flowchart of a tenant group creation process.

FIG. 16 is a flowchart of a tenant group creation process performed by the CPU 101 executing the tenant group creation program 930.

When the tenant group creation process is started in step S930, an entry is added to the tenant group management table 1110 in step S931.

In step S932, each piece of information of the entry added in step S931 is registered. Here, each piece of information including the tenant group ID 1111, the group belonging tenant ID 1112, the group manager ID 1113, and the intra-group permission action 1114 is registered for the added entry based on an instruction and the like from the user.

In step S933, it is determined whether the tenant management unit 11 includes the computing tenant management unit 11B or the storage tenant management unit 11C in the computer system 1. As described above, the computing tenant management unit 11B and the storage tenant management unit 11C are not essential components in the computer system 1. Therefore, the tenant management unit 11 may not include one or both of these components, and also may be configured by the integrated tenant management unit 11A alone or the integrated tenant management unit 11A and one of the computing tenant management unit 11B and the storage tenant management unit 11C. In step S933, a difference in a configuration of such a tenant management unit 11 is determined. As a result, when the tenant management unit 11A includes at least one of the computing tenant management unit 11B and the storage tenant management unit 11C in addition to the integrated tenant management unit 11A, the process proceeds to step S934. On the other hand, when the tenant management unit 11 does not include both the computing tenant management unit 11B and the storage tenant management unit 11C, the process proceeds to step S935.

In step S934, one or both of the computing tenant management unit 11B and the storage tenant management unit 11C included in the tenant management unit 11 is notified of registration of the group information. Here, each piece of information registered in step S932 is registered as group information relating to an added tenant group and is notified to the computing tenant management unit 11B or the storage tenant management unit 11c in order to manage each K8s cluster 20 and the storage 30 of the computer system 1 based on the group information.

In step S935, a necessary authority is granted to each tenant in the added tenant group. Here, the authority can be granted to each tenant by setting each K8s cluster 20 and the storage 30 according to, for example, each piece of information registered in step S932.

After the process of step S934 or S935 is performed, the tenant group creation process illustrated in the flowchart of FIG. 16 is ended.

The CPU 101 executes the tenant group creation program 930 to perform the tenant group creation process described above, and thus can function as the integrated tenant management unit 11A, can set a tenant group, in which any two or more tenants among a plurality of tenants are grouped, in the storage 30, and can define an access authority in the tenant group for each K8s cluster 20 corresponding to each tenant belonging to the set tenant group.

A tenant group deletion process and a tenant group change process can also be performed by the CPU 101 executing the tenant group deletion program 940 and the tenant group change program 950 according to the flowchart in FIG. 16. Specifically, in step S931, an entry is deleted or changed instead of being added; and in step S932, information is deleted or changed instead of being registered. In step S934, deletion or change of the group information is notified instead of notifying the registration of the group information; and in step S935, an authority is deleted or changed instead of being granted. By performing the tenant group deletion or the tenant group change, the CPU 101 can function as the integrated tenant management unit 11A and can delete or change the tenant group.

Figure 17:
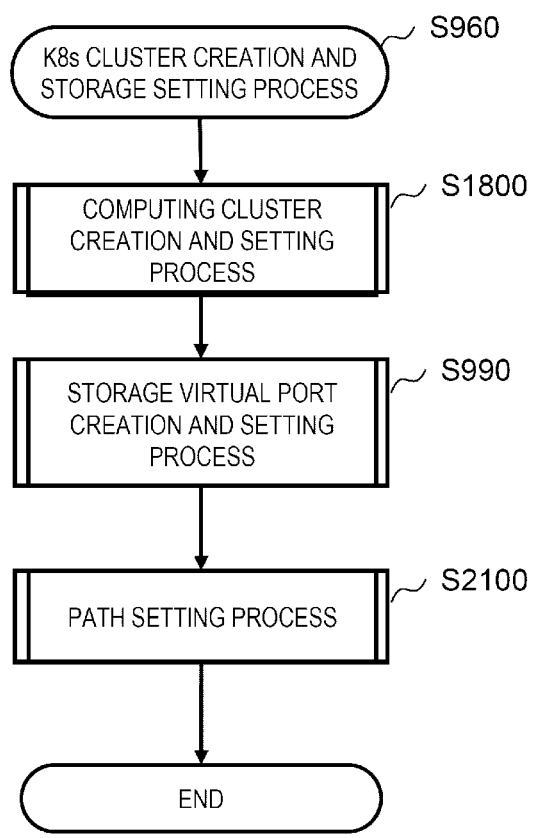
FIG. 17 is a flowchart of a K8s cluster creation and storage setting process.

FIG. 17 is a flowchart of a K8s cluster creation and storage setting process performed by the CPU 101 executing the K8s cluster creation and storage setting program 960.

When the K8s cluster creation and storage setting process is started in step S960, a computing cluster creation and setting process for creating and setting the K8s cluster 20 is performed in step S1800. Details of the computing cluster creation and setting process will be described later with reference to FIG. 18.

After the computing cluster creation and setting process is performed, in step S990, a storage virtual port creation and setting process is performed by executing the storage virtual port creation and setting program 990 to create and set the virtual target port in the storage 30. Details of the storage virtual port creation and setting process will be described later with reference to FIGS. 19 and 20.

After the storage virtual port creation and setting process is performed, in step S2100, a path setting process is performed to set a path between the initiator port of each K8s node 21 in the K8s cluster 20, which is created in step S1800, and the virtual target port of the storage 30, which is created in step S990. Details of the path setting process will be described later with reference to FIGS. 21 to 27.

After the path setting process of step S2100 is performed, the K8s cluster creation and storage setting process illustrated in the flowchart of FIG. 17 is ended.

The CPU 101 executes the K8s cluster creation and storage setting program 960 to perform the K8s cluster creation and storage setting process described above, and thus can function as the integrated tenant management unit 11A and can manage association between the K8s cluster 20 and the tenant by setting, in the storage 30, a plurality of virtual target ports corresponding to each K8s node 21 of the K8s cluster 20.

The flowchart of FIG. 17 illustrates an example of a process of associating the computing part and the tenant in a case where the computing part is implemented by the plurality of K8s clusters 20 in the computer system 1, and the computing part and the tenant can also be associated by the same process in other configurations. For example, when the computing part is configured by another container, a virtual machine, a physical machine, or a group thereof, the computing part can also be associated with the tenant by the same process.

Figure 18:
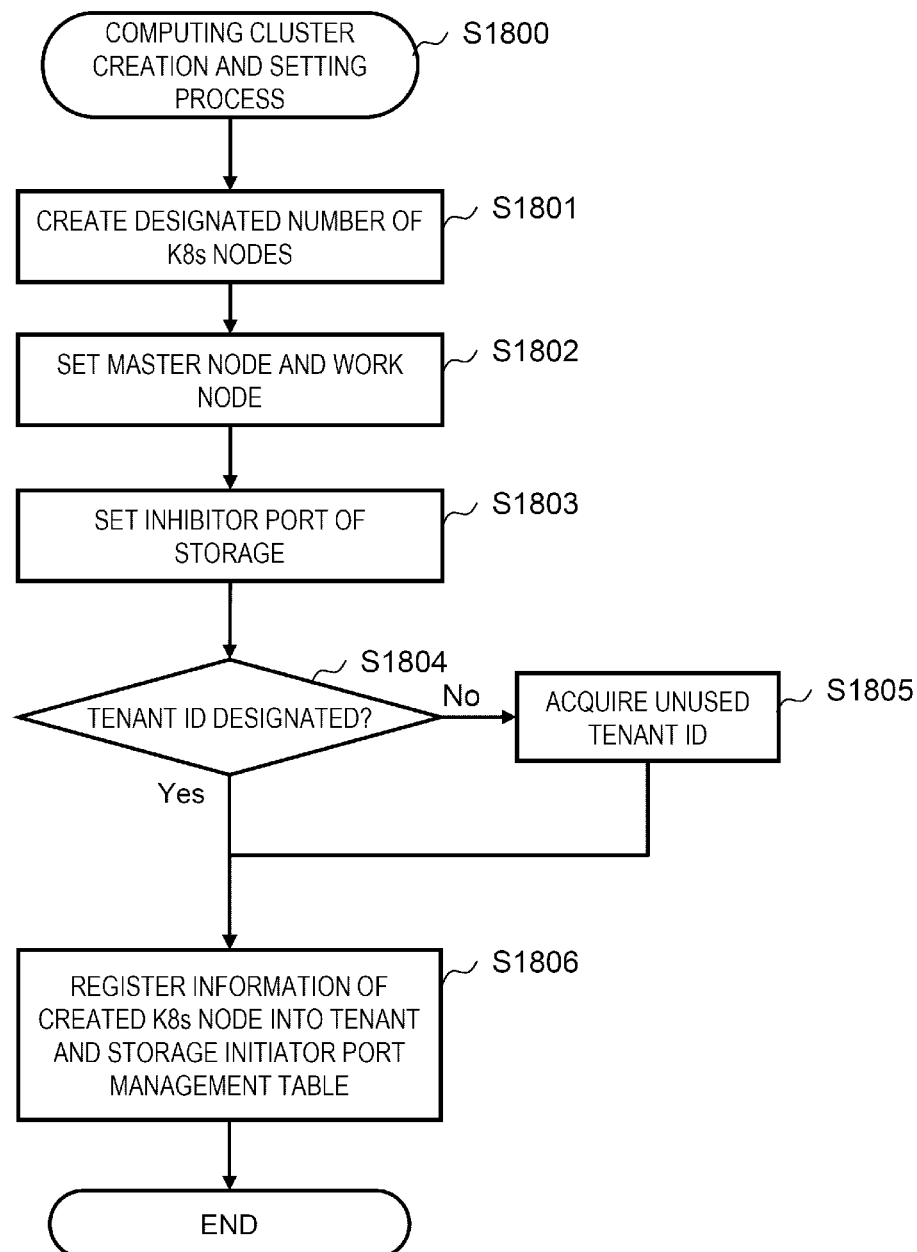
FIG. 18 is a flowchart of a computing cluster creation and setting process.

FIG. 18 is a flowchart of the computing cluster creation and setting process performed in step S1800 of FIG. 17.

In step S1801, a designated number of K8s nodes 21 are created in the computing part configured by one or a plurality of bare metal nodes 10. Here, for example, the K8s node 21 can be created by creating a designated number of virtual machines and arranging the virtual machines in each bare metal node 10. Alternatively, the K8s node 21 may be created by preparing a designated number of bare metal nodes 10 and using each bare metal node 10 as the K8s node 21.

In step S1802, a node type is set for each K8s node 21 created in step S1801. Here, a certain one of the K8s nodes 21 is set as a master node, and the remaining K8s nodes 21 are set as worker nodes.

In step S1803, an initiator port used for connection to the storage 30 is set for each K8s node 21 created in step S1801.

In step S1804, it is determined whether the tenant ID is designated for each K8s node 21 created in step S1801. For example, in a case where the tenant ID is designated, such as a case where the K8s node 21 is newly added for the created tenant, the process proceeds to step S1806. On the other hand, in a case where the tenant ID is not designated, such as a case where the K8s node 21 is created for a new tenant, the process proceeds to step S1805.

In step S1805, an unused tenant ID is acquired. Here, as in step S901 of FIG. 14, the unused tenant ID can be acquired by acquiring any ID that is not registered in the tenant ID 1101 in the tenant and manager management table 1100, for example, an ID having the smallest number among the unregistered IDs. In step S1805, after an unused tenant ID is acquired, the process proceeds to step S1806.

In step S1806, information of the K8s nodes 21 created in step S1801 is registered in the tenant and storage initiator port management table 1210. Here, entries corresponding to the number of the created K8s nodes 21 are added to the tenant and storage initiator port management table 1210, an ID unique to each entry is registered in the initiator port ID 1211 of each entry, and the designated tenant ID or the tenant ID acquired in step S1805 is registered in the tenant ID 1212 of each entry. Each piece of information including the computing tenant ID 1213, the IP address 1214, and the initiator name 1215 is registered according to the contents set in steps S1802 and S1803. After the information is registered, the computing cluster creation and setting process illustrated in the flowchart of FIG. 18 is ended.

Figure 19:
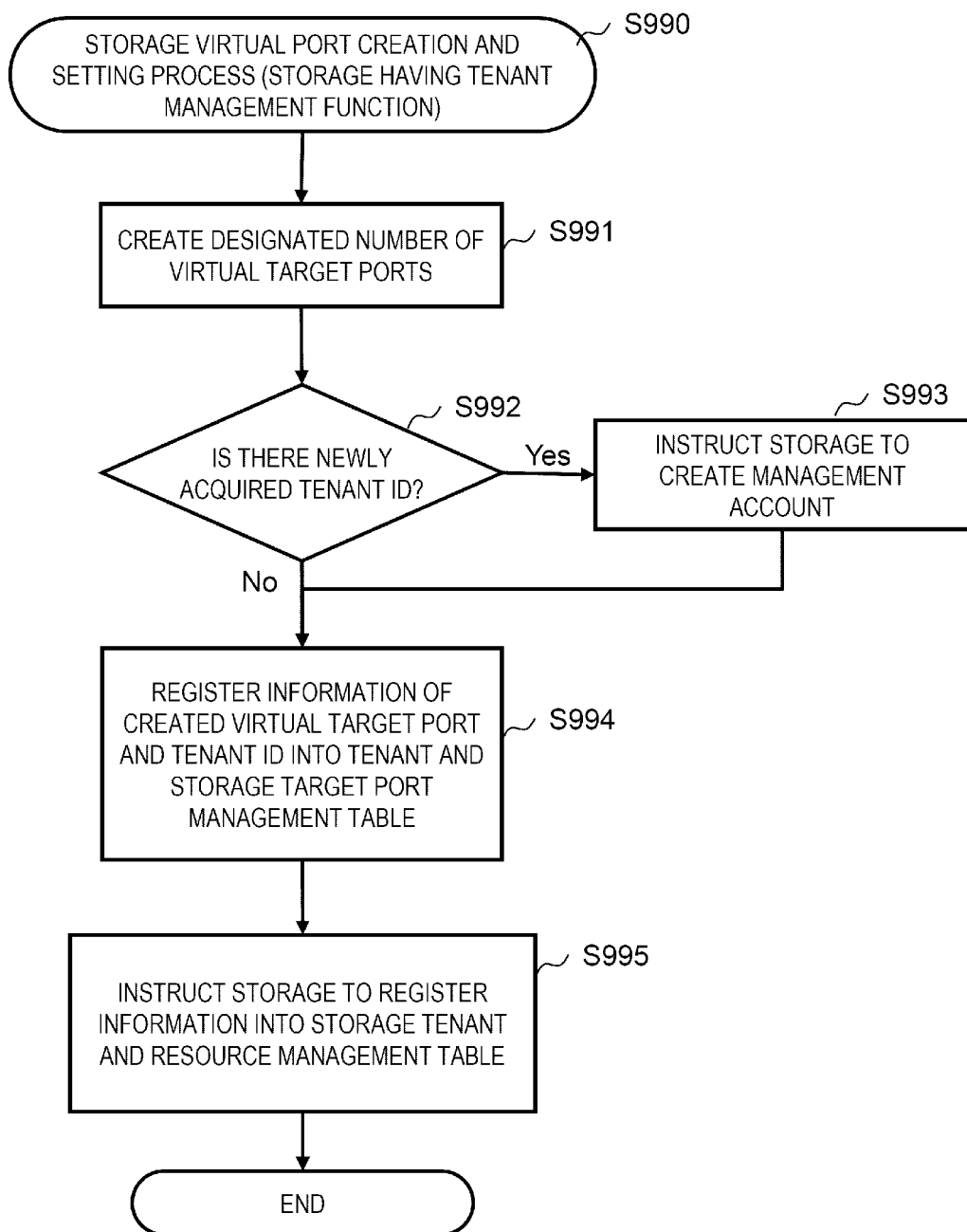
FIG. 19 is a flowchart of a storage virtual port creation and setting process in a case of a storage having a tenant management function.
Figure 20:
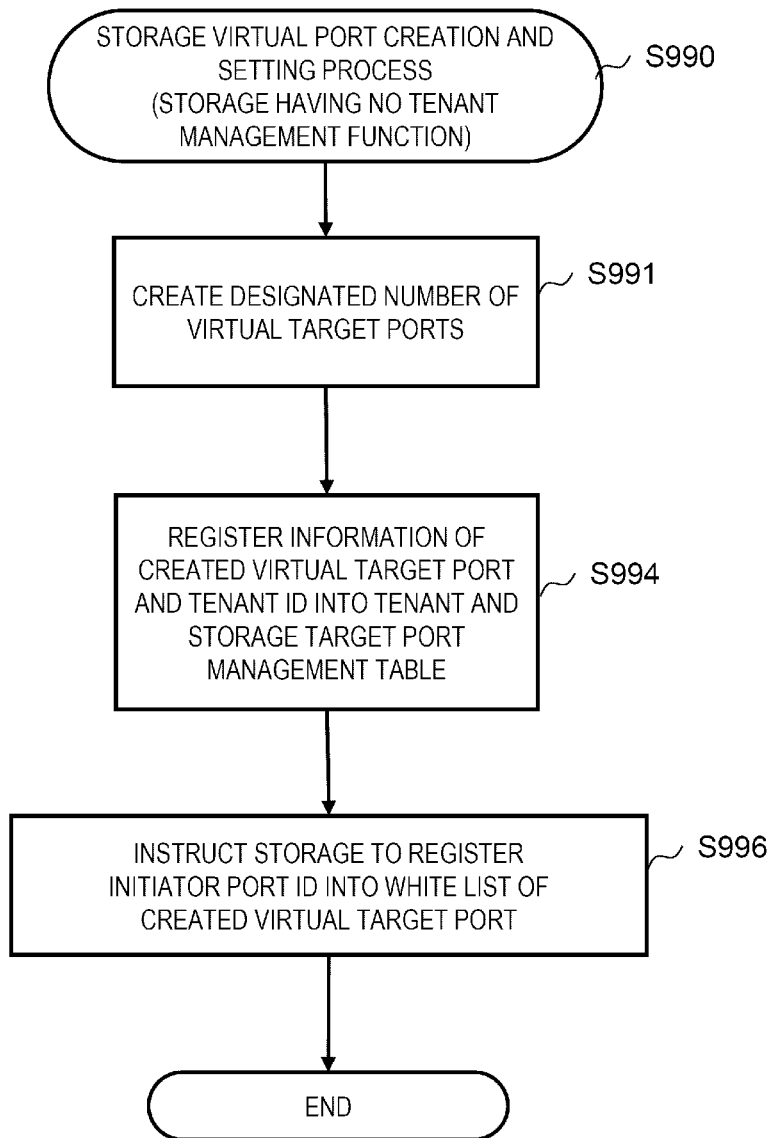
FIG. 20 is a flowchart of a storage virtual port creation and setting process in a case of a storage having no tenant management function.

FIGS. 19 and 20 are flowcharts of the storage virtual port creation and setting process performed in step S990 of FIG. 17. Here, the storage virtual port creation and setting process is executed in different processing procedures in a case where the storage 30 has a tenant management function and in a case where the storage 30 has no tenant management function. FIG. 19 is a flowchart of the storage virtual port creation and setting process in a case where the storage 30 has the tenant management function, while FIG. 20 is a flowchart of the storage virtual port creation and setting process in a case where the storage 30 has no tenant management function. Hereinafter, the flowchart of FIG. 19 will be described first, and then the flowchart of FIG. 20 will be described.

In FIG. 19, in step S991, a designated number of virtual target ports are created in the storage 30. Here, for example, the virtual target ports are created in the storage 30 in a number corresponding to the number of the K8s nodes 21 created in step S1801 of FIG. 18. At this time, in the storage 30 which is the SDS cluster, when an SDS node 31 to be created is designated in consideration of load distribution among the SDS nodes 31, a virtual target port is created for the SDS node 31.

In step S992, it is determined whether the tenant ID of each virtual target port created in step S991 is a newly acquired tenant ID. When an unused tenant ID is newly acquired by executing the process of step S1805 in FIG. 18 in the computing cluster creation and setting process of step S1800, the tenant ID of the created virtual target port is determined as the newly acquired tenant ID, and the process proceeds to step S993. On the other hand, when the process of step S1805 is not executed, the tenant ID of each created virtual target port is not determined as the newly acquired tenant ID, and the process proceeds to step S994.

In step S993, the storage 30 is instructed to create a storage management account for the storage tenant ID of the created virtual target port. According to the instruction, after the storage management account is created in the storage 30, the process proceeds to step S994.

In step S994, information of the virtual target ports created in step S991 and the tenant IDs of the respective virtual target ports is registered in the tenant and storage target port management table 1200. Here, entries corresponding to the number of the created virtual target ports are added to the tenant and storage target port management table 1200, an ID unique to each entry is registered in the virtual target port ID 1201 of each entry, and the same tenant ID as that registered in the tenant ID 1212 of the tenant and storage initiator port management table 1210 in step S1806 of FIG. 18 is registered in the tenant ID 1202 of each entry. Each piece of information including the storage tenant ID 1203, the IP address 1204, the TCP port number 1205, and the target name 1206 is registered according to setting information when the virtual target ports are created in step S991.

In step S995, the storage 30 is instructed to register information into the storage tenant and resource management table 1310. Here, the storage 30 is instructed to register, according to the setting information when the virtual target ports are created in step S991, each piece of information including the storage tenant ID 1311, the storage resource type 1312, and the resource ID 1313 into the storage tenant and resource management table 1310. After the storage 30 is instructed to register information, the storage virtual port creation and setting process illustrated in the flowchart of FIG. 19 is ended.

In FIG. 20, the same processes as in FIG. 19 are performed in steps S991 and S994.

After the process of step S994 is performed, in step S996, the storage 30 is instructed to register initiator port IDs into a white list of the virtual target ports created in step S991. Here, for example, by collating the tenant ID registered in the tenant and storage target port management table 1200 in step S994 with the initiator port ID 1211 and the tenant ID 1212 of the tenant and storage initiator port management table 1210, IDs of all the initiator ports belonging to the same tenant as the virtual target port are acquired as IDs of the initiator ports corresponding to the respective created virtual target ports. Then, the storage 30 is instructed to register the acquired initiator port IDs into the white list of the virtual target ports included in the storage 30, that is, a list of the initiator port IDs permitted to be connected to each virtual target port. After the storage 30 is instructed, the storage virtual port creation and setting process illustrated in the flowchart of FIG. 20 is ended.

Figure 21:
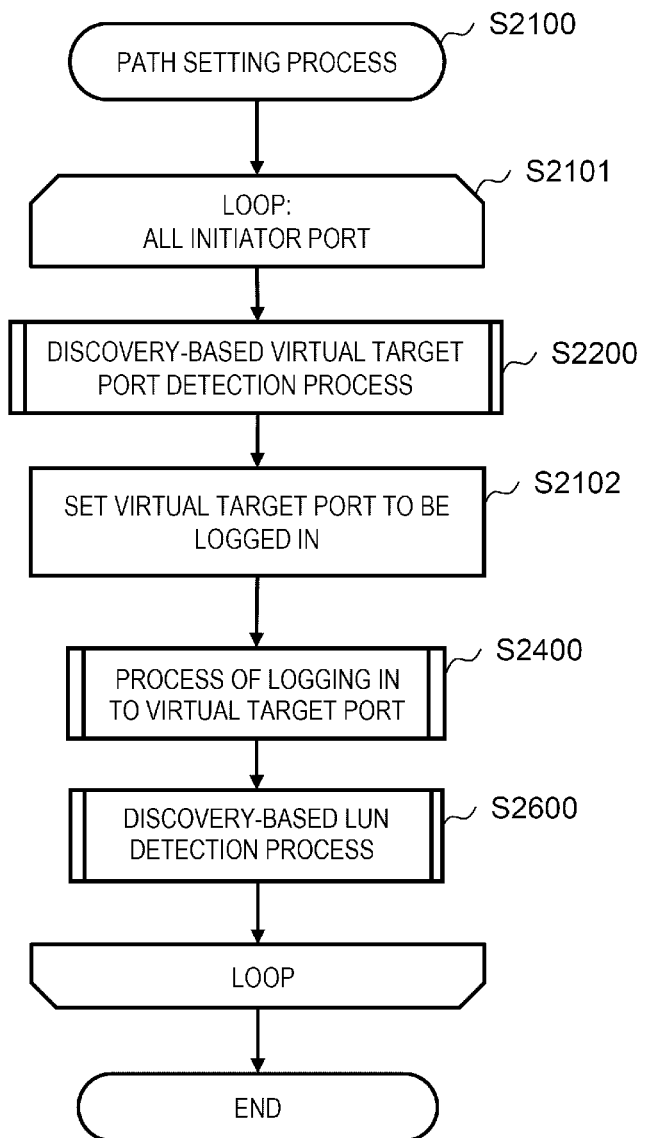
FIG. 21 is a flowchart of a path setting process.

FIG. 21 is a flowchart of the path setting process performed in step S2100 of FIG. 17.

In step S2101, a loop process of steps S2200, S2102, S2400, and S2600 is performed on each initiator port included in the computer system 1, that is, each initiator port included in all K8s nodes 21 of the computer system 1.

In step S2200, a discovery-based virtual target port detection process is performed for detecting, in the storage 30, a virtual target port corresponding to each initiator port to be processed. Details of the discovery-based virtual target port detection process will be described later with reference to FIGS. 22 and 23.

In step S2102, a certain one of the virtual target ports detected by the process of step S2200 is set as the virtual target port to be logged in by the initiator port. Here, the virtual target ports to be logged in can be set using, for example, asymmetric logical unit access (ALUA).

In step S2400, a process of logging in from the initiator port to be processed to the virtual target port to be logged in, which is set in step S2102, is performed. Details of the process of logging in to the virtual target port will be described later with reference to FIGS. 24 and 25.

In step S2600, a discovery-based LUN detection process is performed for detecting a LUN corresponding to the initiator port to be processed in the storage 30. Details of the discovery-based LUN detection process will be described later with reference to FIGS. 26 and 27.

After the loop process of steps S2200 to S2600 is performed for all the initiator ports to be processed, the path setting process illustrated in the flowchart of FIG. 21 is ended.

The CPU 101 performs the path setting process described above in the K8s cluster creation and storage setting process, and thus can function as the integrated tenant management unit 11A and can control the storage 30 for each of the plurality of K8s clusters 20 such that the access from the K8s cluster 20 to the tenant corresponding to the K8s cluster 20 is permitted and the access from the K8s cluster 20 to the tenant not corresponding to the K8s cluster 20 is prohibited. When the tenant groups are set, the CPU 101 can control the storage 30 for each of the plurality of K8s clusters 20 according to the access authority defined at the time of setting the tenant groups such that access from the K8s cluster 20 to each of other tenants belonging to the same tenant group as the tenant corresponding to the K8s cluster 20 is permitted or prohibited.

In the path setting process described above, not all of the processes of steps S2200, S2400, and S2600 are necessarily performed, and a certain one of the processes may be omitted. For example, it is possible to perform the discovery-based virtual target port detection process of step S2200 and the process of logging in to the virtual target ports of step S2400 and not perform the discovery-based LUN detection process of step S2600. The path setting process can be performed by any method as long as it is possible to appropriately set a path for which access is permitted or prohibited according to the tenant setting between the initiator port of each K8s node 21 and each virtual target port of the storage 30.

Figure 22:
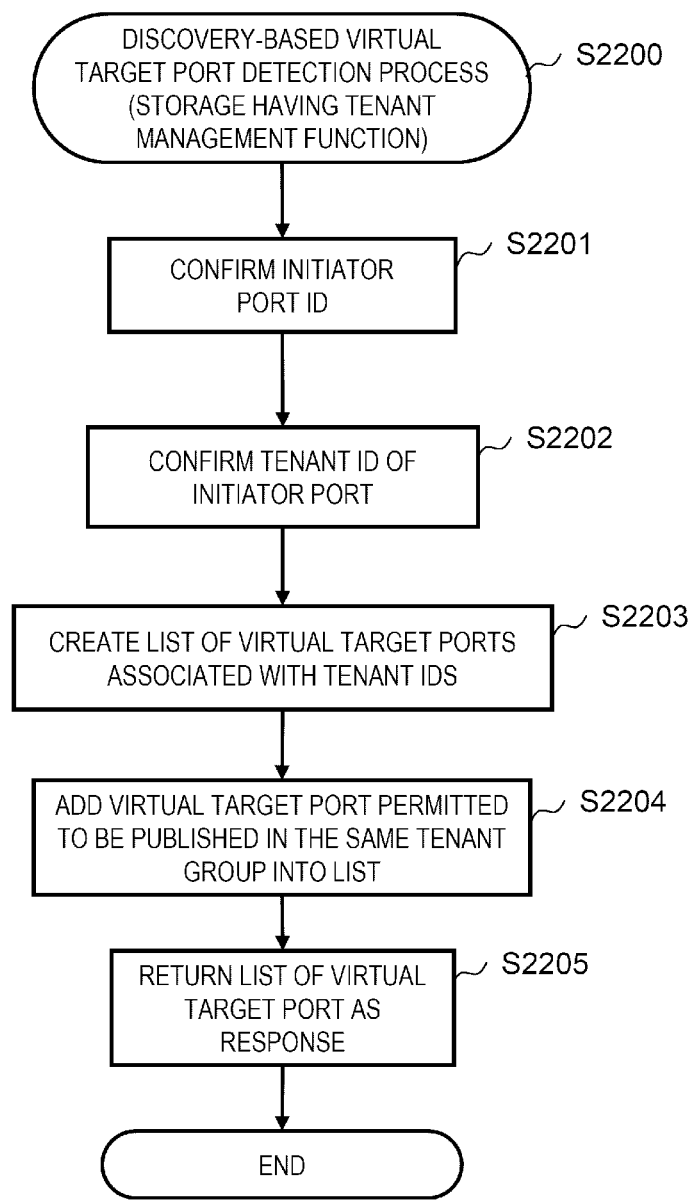
FIG. 22 is a flowchart of a discovery-based virtual target port detection process in a case of a storage having the tenant management function.
Figure 23:
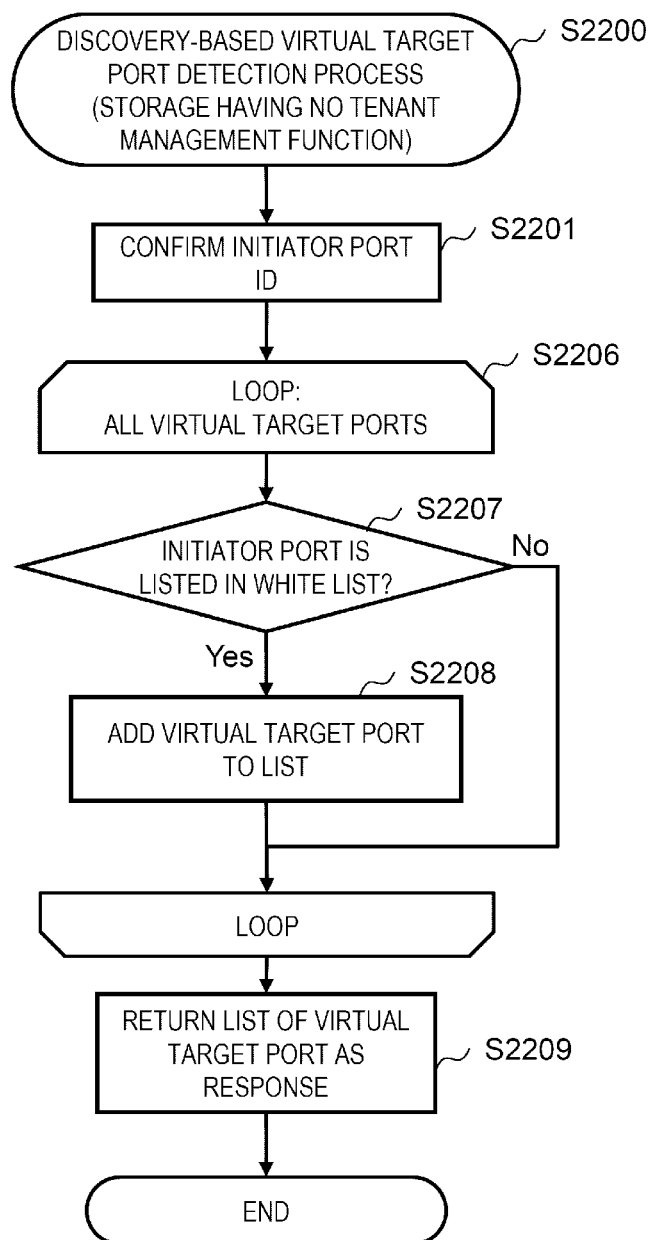
FIG. 23 is a flowchart of a discovery-based virtual target port detection process in a case of a storage having no tenant management function.

FIGS. 22 and 23 are flowcharts of the discovery-based virtual target port detection process performed in step S2200 of FIG. 21. Here, the discovery-based virtual target port detection process is executed in different processing procedures in a case where the storage 30 has the tenant management function and in a case where the storage 30 has no tenant management function. FIG. 22 is a flowchart of the discovery-based virtual target port detection process in a case where the storage 30 has the tenant management function, while FIG. 23 is a flowchart of the discovery-based virtual target port detection process in a case where the storage 30 has no tenant management function. Hereinafter, the flowchart of FIG. 22 will be described first, and then the flowchart of FIG. 23 will be described.

In FIG. 22, the initiator port ID is confirmed in step S2201. Here, the initiator port ID is confirmed based on information of the initiator port that issues a discovery request.

In step S2202, a tenant ID of the initiator port to be processed is confirmed. Here, for example, in the tenant and storage initiator port management table 1210, the tenant ID of the initiator port can be confirmed by referring to the tenant ID 1212 of a record in which the initiator port ID confirmed in step S2201 is stored.

In step S2203, a list of the virtual target ports associated with the tenant ID confirmed in step S2202 is created. Here, for example, in the tenant and storage target port management table 1200, all records in each of which the same ID value as the tenant ID confirmed in step S2202 is stored in the tenant ID 1202 are specified, and a value of the virtual target port ID 1201 of each record is acquired. As a result, the list of the virtual target ports associated with the tenant IDs can be created.

In step S2204, the list created in step S2203 is added with virtual target ports permitted to be published in the same tenant group as the tenant to which the initiator port to be processed belongs. Here, for example, based on the tenant IDs confirmed in step S2202 and with reference to the tenant group management table 1110, all records in which information indicating publish permission is stored in the intra-group permission action 1114 are specified, among records in which a plurality of ID values including the tenant ID are recorded in the group belonging tenant ID 1112. In the group belonging tenant ID 1112 of each specified record, the ID value of each tenant excluding the tenant of the initiator port is acquired. Thereafter, with reference to the tenant and storage target port management table 1200, a record in which the same ID value as the acquired tenant ID is stored in the tenant ID 1202 is specified, and the value of the virtual target port ID 1201 of each record is acquired. As a result, the virtual target ports permitted to be published in the tenant group can be specified and can be added to the list.

In step S2205, the list of the virtual target ports created in steps S2203 and S2204 is returned to the K8s node 21 having the initiator port to be processed as a response. Here, the list of the created virtual target ports is transmitted to the K8s node 21. After the list of the virtual target ports is transmitted, the discovery-based virtual target port detection process illustrated in the flowchart of FIG. 22 is ended.

In FIG. 23, in step S2201, the same process as in FIG. 22 is performed on each initiator port that issues the discovery request in step S2101 of FIG. 21.

In step S2206, after each virtual target port included in the computer system 1, that is, each virtual target port included in all SDS nodes 31 of the storage 30 is sequentially selected as a loop process target, a loop process of steps S2207 and S2208 is performed.

In step S2207, it is determined whether the initiator port ID confirmed in step S2201 is listed in a white list of the virtual target port selected as the loop process target in step S2206. When the initiator port ID is listed in the white list of the virtual target port, the process proceeds to step S2208, otherwise, the process proceeds to the next loop process.

In step S2208, the virtual target port determined in step S2207 that the initiator port ID is listed in the white list is added to a list that is returned to the K8s node 21 having the initiator port.

After the loop process of steps S2207 and S2208 is performed for all the virtual target ports, the process proceeds to step S2209.

In step S2209, the list of the virtual target ports created in the loop process of steps S2207 and S2208 is returned, as a response, to the K8s node 21 including the initiator port to be processed. After the list of the virtual target ports is transmitted to the K8s node 21, the discovery-based virtual target port detection process illustrated in the flowchart of FIG. 23 is ended.

Figure 24:
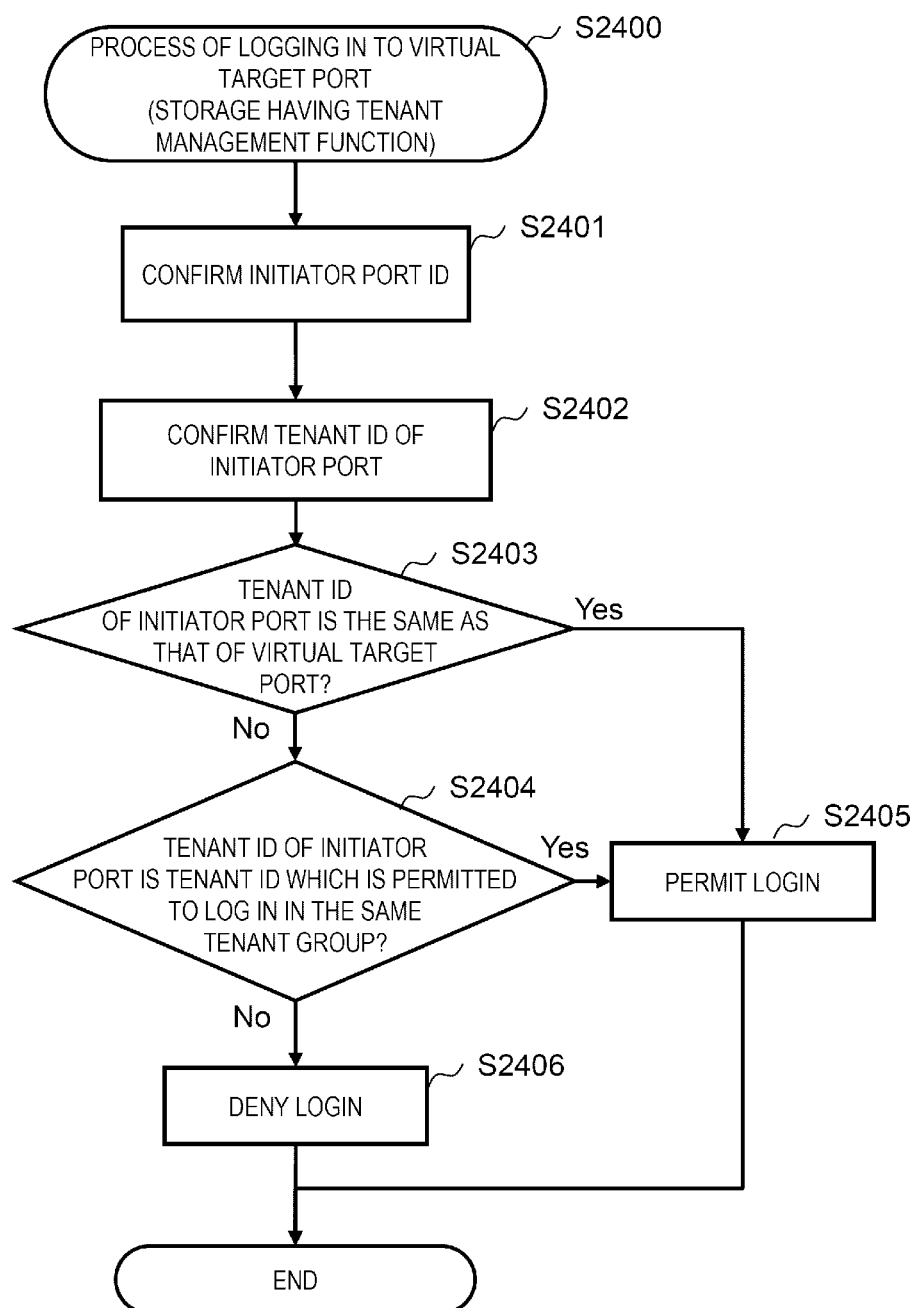
FIG. 24 is a flowchart of a process of logging in to a virtual target port in a case of a storage having the tenant management function.
Figure 25:
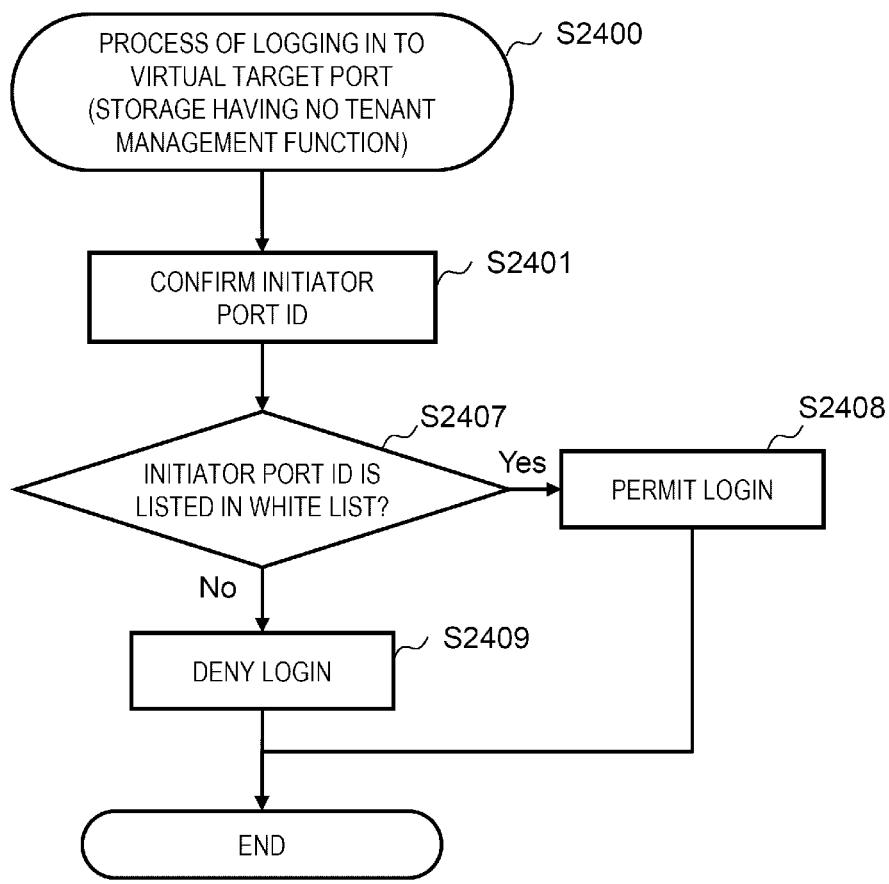
FIG. 25 is a flowchart of a process of logging in to a virtual target port in a case of a storage having no tenant management function.

FIGS. 24 and 25 are flowcharts of the process of logging in to the virtual target port performed in step S2400 of FIG. 21. Here, the process of logging in to the virtual target port is executed in different processing procedures in a case where the storage has the tenant management function and in a case where the storage 30 has no tenant management function. FIG. 24 is a flowchart of the process of logging in to the virtual target port in a case where the storage 30 has the tenant management function, while FIG. 25 is a flowchart of the process of logging in to the virtual target port in a case where the storage 30 has no tenant management function. Hereinafter, the flowchart of FIG. 24 will be described first, and then the flowchart of FIG. 25 will be described.

In FIG. 24, the initiator port ID is confirmed in step S2401. Here, by the same method as in step S2201 of FIGS. 22 and 23, for each initiator port that issues a login request in step S2101 of FIG. 21, an ID value of the initiator port can be confirmed.

In step S2402, the tenant ID of each initiator port to be processed is confirmed. Here, by the same method as in step S2202 of FIG. 22, the tenant ID of the initiator port can be confirmed.

In step S2403, it is determined whether the tenant ID confirmed in step S2402 is a tenant ID the same as that of the virtual target port requested to log in from the initiator port. Here, for example, in the tenant and storage target port management table 1200, the tenant ID of the virtual target port is acquired with reference to the tenant ID 1202 of a record corresponding to the virtual target port requested to log in. By confirming whether the acquired tenant ID matches the tenant ID confirmed in step S2402, it is possible to determine whether the initiator port to be processed and the virtual target port requested to log in from the initiator port have the same tenant ID. As a result, when both have the same tenant ID, the process proceeds to step S2405, otherwise, the process proceeds to step S2404.

In step S2404, it is determined whether the tenant ID confirmed in step S2402 is a tenant ID that is permitted to log in in the same tenant group as that of the virtual target port requested to log in from the initiator port. Here, for example, with reference to the tenant group management table 1110, it is determined whether both of the tenant ID confirmed in step S2402 and the tenant ID of the virtual target port acquired in step S2403 are stored in the group belonging tenant ID 1112 of a certain record. When a record that satisfies such a condition exists, it is confirmed whether login in the tenant group is permitted with reference to the intra-group permission action 1114 of the record. As a result, when the login in the tenant group is permitted, the process proceeds to step S2405. On the other hand, when the login in the tenant group is not permitted or when no record that satisfies the condition described above exists in the tenant group management table 1110, the process proceeds to step S2406.

In step S2405, login from the initiator port to the virtual target port is permitted.

In step S2406, the login from the initiator port to the virtual target port is denied.

After the process of step S2405 or S2406 is performed, the process of logging in to the virtual target port illustrated in the flowchart of FIG. 24 is ended.

In FIG. 25, in step S2401, the same process as in FIG. 24 is performed on the initiator port set as the process target in step S2101 of FIG. 21.

In step S2407, it is determined whether the initiator port ID confirmed in step S2401 is listed in the white list of the virtual target ports requested to log in from the initiator ports to be processed. When the initiator port ID is listed in the white list of the virtual target port, the process proceeds to step S2408, otherwise, the process proceeds to step S2409.

In step S2408, the login from the initiator port to the virtual target port is permitted.

In step S2409, the login from the initiator port to the virtual target port is denied.

After the process of step S2408 or S2409 is performed, the process of logging in to the virtual target port illustrated in the flowchart of FIG. 25 is ended.

Figure 26:
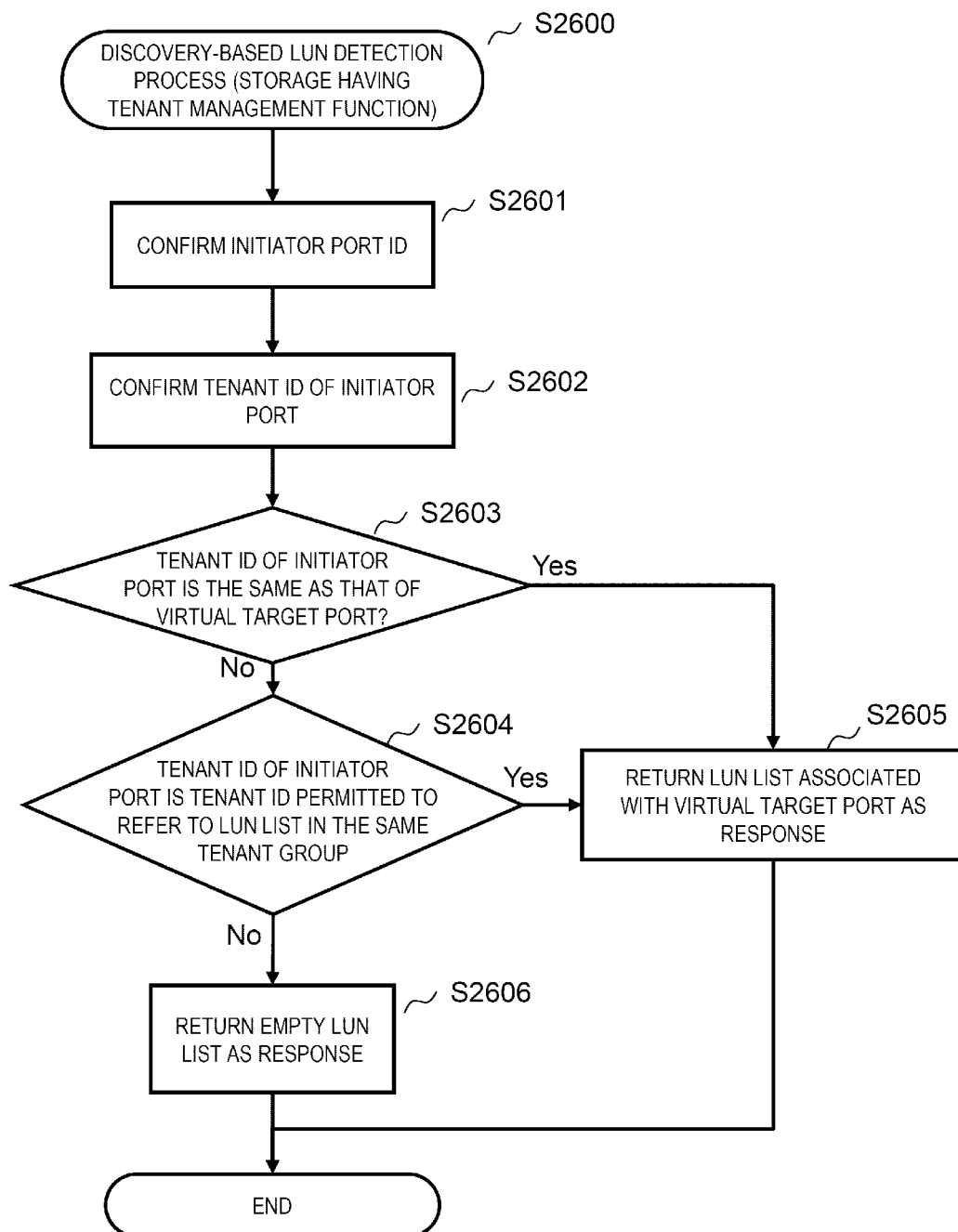
FIG. 26 is a flowchart of a discovery-based LUN detection process in a case of a storage having the tenant management function.
Figure 27:
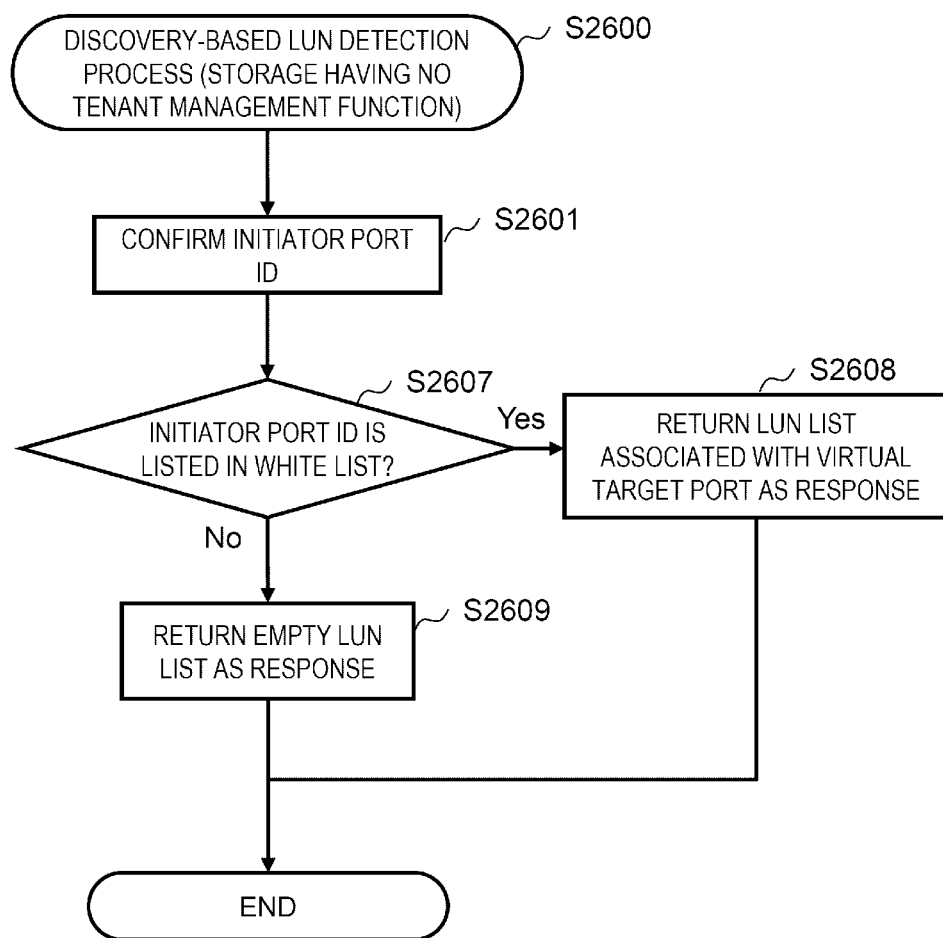
FIG. 27 is a flowchart of a discovery-based LUN detection process in a case of a storage having no tenant management function.

FIGS. 26 and 27 are flowcharts of the discovery-based LUN detection process performed in step S2600 of FIG. 21. Here, the discovery-based LUN detection process is executed in different processing procedures in a case where the storage 30 has the tenant management function and in a case where the storage 30 has no tenant management function. FIG. 26 is a flowchart of the discovery-based LUN detection process in a case where the storage 30 has the tenant management function, while FIG. 27 is a flowchart of the discovery-based LUN detection process in a case where the storage 30 has no tenant management function. Hereinafter, the flowchart of FIG. 26 will be described first, and then the flowchart of FIG. 27 will be described.

In FIG. 26, the initiator port IDs are confirmed in step S2601. Here, by the same method as in step S2201 of FIGS. 22 and 23 or step S2401 of FIGS. 24 and 25, for each initiator port that issues a LUN discovery request, an ID value of the initiator port can be confirmed.

In step S2602, the tenant ID of each initiator port to be processed is confirmed. Here, by the same method as in step S2202 of FIG. 22 or step S2402 of FIG. 24, the tenant ID of the initiator port can be confirmed.

In step S2603, it is determined whether the tenant ID confirmed in step S2602 is a tenant ID the same as that of the virtual target port for which a LUN list is requested from the initiator port. Here, by the same method as in step S2403 of FIG. 24, it is possible to determine whether the initiator port to be processed and the virtual target port for which the LUN list is requested from the initiator port have the same tenant ID. As a result, when both have the same tenant ID, the process proceeds to step S2605, otherwise, the process proceeds to step S2604.

In step S2604, it is determined whether the tenant ID confirmed in step S2602 is a tenant ID permitted to refer to the LUN list in the same tenant group as that of the virtual target port for which the LUN list is requested from the initiator port. Here, by the same method as in step S2404 of FIG. 24, it is possible to determine whether the reference to the LUN list in the tenant group is permitted. As a result, when the reference to the LUN list in the tenant group is permitted, the process proceeds to step S2605, otherwise, the process proceeds to step S2606.

In step S2605, the LUN list associated with the virtual target port is returned, as a response, to the K8s node 21 having the initiator port to be processed.

In step S2606, an empty LUN list is returned, as a response, to the K8s node 21 having the initiator port to be processed.

After the process of step S2605 or S2606 is performed, the discovery-based LUN detection process illustrated in the flowchart of FIG. 26 is ended.

In FIG. 27, in step S2601, the same process as in FIG. 26 is performed on each initiator port that issues the LUN discovery request in step S2101 of FIG. 21.

In step S2607, it is determined whether the initiator port ID confirmed in step S2601 is listed in a white list of the virtual target ports for which the LUN list is requested from the initiator port to be processed. When the initiator port ID is listed in the white list of the virtual target port, the process proceeds to step S2608, otherwise, the process proceeds to step S2609.

In step S2608, the LUN list associated with the virtual target port is returned, as a response, to the K8s node 21 having the initiator port to be processed, as in step S2605 of FIG. 26.

In step S2609, an empty LUN list is returned, as a response, to the K8s node 21 having the initiator port to be processed, as in step S2606 of FIG. 26.

After the process of step S2608 or S2609 is performed, the discovery-based LUN detection process illustrated in the flowchart of FIG. 27 is ended.

Figure 28:
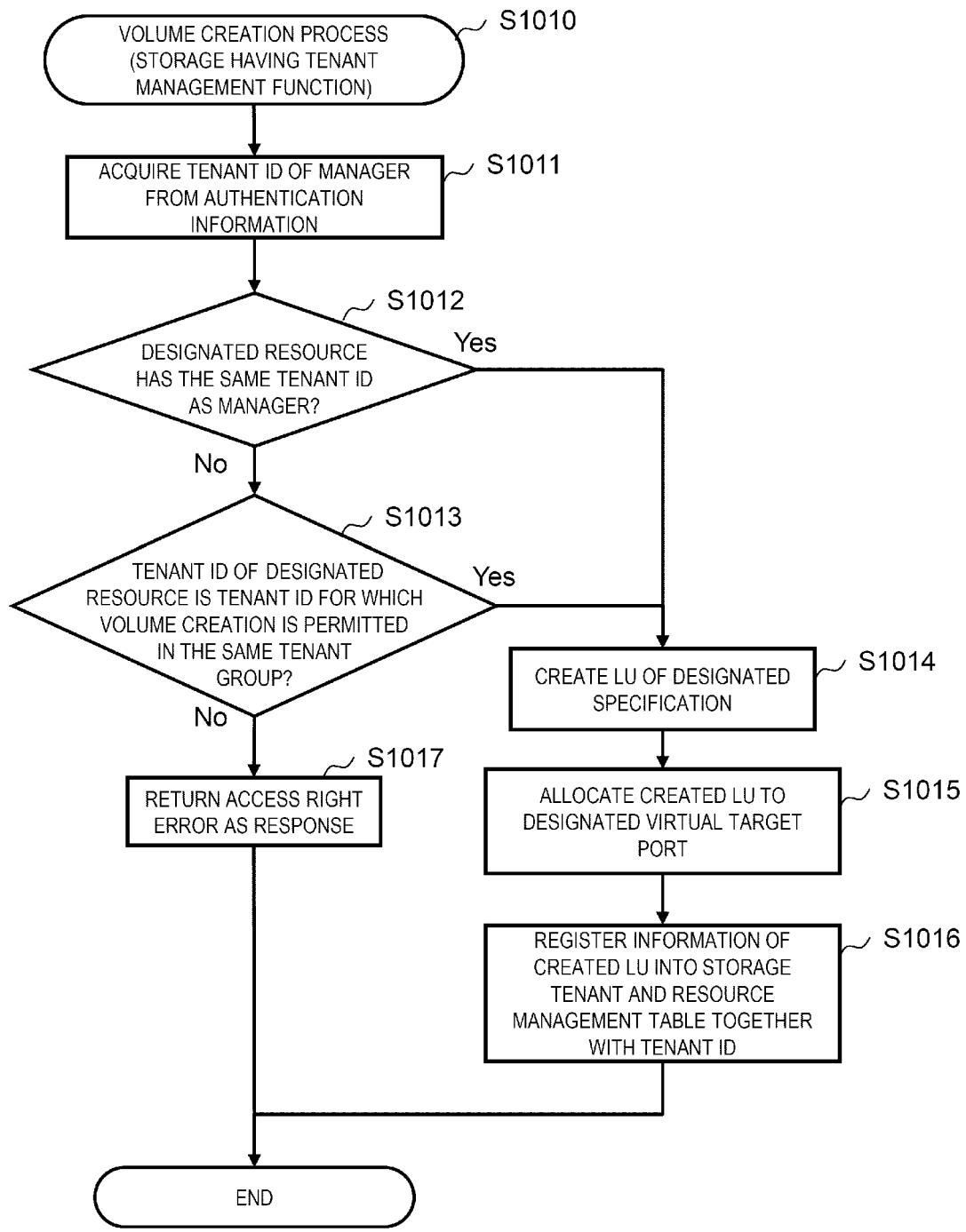
FIG. 28 is a flowchart of a volume creation process in a case of a storage having the tenant management function.

FIG. 28 is a flowchart of a volume creation process performed by the CPU 101 executing the volume creation program 1010 in a case where the storage 30 has the tenant management function.

When the volume creation process is started in step S1010, in step S1011, a tenant ID of a manager who instructs the storage 30 to create a volume is acquired based on authentication information of the manager. Here, with reference to the storage tenant and manager management table 1300, it is possible to acquire the tenant ID of the manager who instructs the storage 30 to create a volume.

In step S1012, it is determined whether a resource instructed to create a volume in the storage 30 has the same tenant ID as the manager. Here, for example, with reference to the storage tenant and resource management table 1310, it is possible to determine whether the resource instructed to create a volume and the manager have the same tenant ID by confirming a tenant ID of the resource instructed to create a volume and confirming whether the tenant ID matches the tenant ID confirmed at step S1011. As a result, when both have the same tenant ID, the process proceeds to step S1014, otherwise, the process proceeds to step S1013.

In step S1013, it is determined whether a tenant ID of the resource instructed to create a volume in the storage 30 is a tenant ID for which the volume creation is permitted in the same tenant group as that of the manager. Here, for example, it is inquired from the storage tenant management unit 11C to the integrated tenant management unit 11A, whether the tenant ID of the manager acquired in step S1011 and the tenant ID of the resource confirmed in step S1012 are tenant IDs for which the volume creation is permitted in the same tenant group. Upon receiving this inquiry, the integrated tenant management unit 11A refers to the tenant group management table 1110 and determines whether both tenant IDs are stored in the group belonging tenant ID 1112 of a certain record. When a record that satisfies such a condition exists, it is confirmed whether the volume creation in the tenant group is permitted with reference to the intra-group permission action 1114 of the record. As a result, when the volume creation in the tenant group is permitted, a response indicating that the tenant ID is a tenant ID for which the volume creation in the tenant group is permitted is sent to the storage tenant management unit 11C. On the other hand, when the volume creation in the tenant group is not permitted or when no record that satisfies the condition described above exists in the tenant group management table 1110, a response indicating that the tenant ID is a tenant ID for which the volume creation in the tenant group is not permitted is sent to the storage tenant management unit 11C. The storage tenant management unit 11C can perform the determination of step S1013 based on the response received from the integrated tenant management unit 11A in this manner. As a result, when the volume creation in the tenant group is permitted, the process proceeds to step S1014, otherwise, the process proceeds to step S1017.

In step S1014, in the storage 30, an LU of a designated specification is created for the designated resource.

In step S1015, the LU created in step S1014 is allocated to the virtual target port designated in the storage 30.

In step S1016, information of the LU created in step S1014 is registered in the storage tenant and resource management table 1310 together with the tenant ID of the resource confirmed in step S1012.

In step S1017, an access right error is returned, as a response, to the manager who instructs the storage 30 to create a volume.

After the process of step S1016 or S1017 is performed, the volume creation process illustrated in the flowchart of FIG. 28 is ended.

Figure 29:
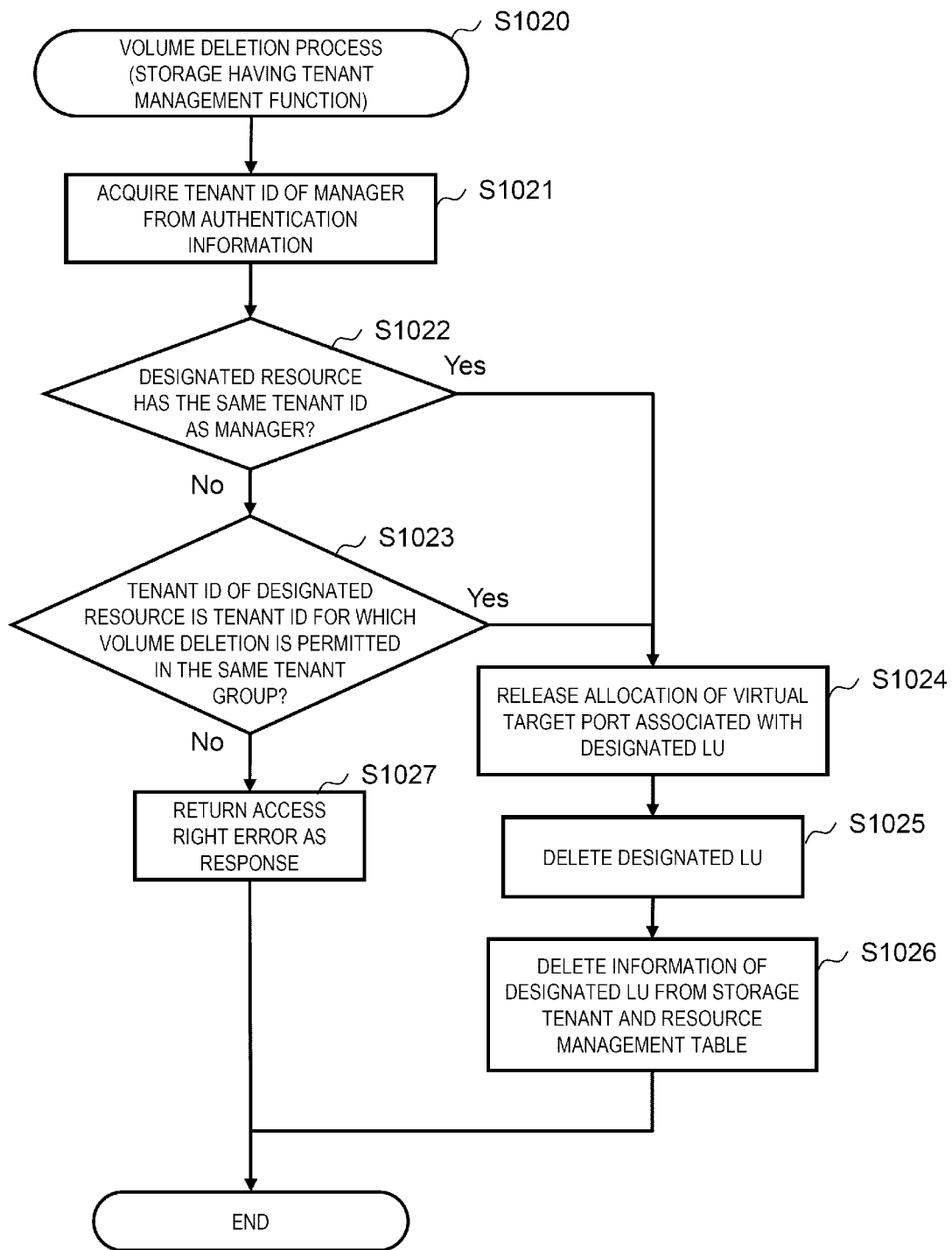
FIG. 29 is a flowchart of a volume deletion process in a case of a storage having the tenant management function.

FIG. 29 is a flowchart of a volume deletion process performed by the CPU 101 executing the volume deletion program 1020 in a case where the storage 30 has the tenant management function.

When the volume deletion process is started in step S1020, in step S1021, a tenant ID of a manager who instructs the storage 30 to delete a volume is acquired based on authentication information of the manager. Here, as in step S1011 of FIG. 28, it is possible to acquire, with reference to the storage tenant and manager management table 1300, the tenant ID of the manager who instructs the storage 30 to delete a volume.

In step S1022, it is determined whether a resource instructed to delete a volume in the storage 30 has the same tenant ID as the manager. Here, by the same method as in step S1012 of FIG. 28, it is possible to determine whether the resource instructed to delete a volume and the manager have the same tenant ID. As a result, when both have the same tenant ID, the process proceeds to step S1024, otherwise, the process proceeds to step S1023.

In step S1023, it is determined whether a tenant ID of the resource instructed to delete a volume in the storage 30 is a tenant ID for which the volume deletion is permitted in the same tenant group as that of the manager. Here, for example, as in step S1013 of FIG. 28, it is inquired from the storage tenant management unit 11C to the integrated tenant management unit 11A, whether the tenant ID of the manager acquired in step S1021 and the tenant ID of the resource confirmed in step S1022 are tenant IDs for which the volume deletion is permitted in the same tenant group. Upon receiving this inquiry, the integrated tenant management unit 11A refers to the tenant group management table 1110 and determines whether both tenant IDs are stored in the group belonging tenant ID 1112 of a certain record. When a record that satisfies such a condition exists, it is confirmed whether the volume deletion in the tenant group is permitted with reference to the intra-group permission action 1114 of the record. As a result, when the volume deletion in the tenant group is permitted, a response indicating that the tenant ID is a tenant ID for which the volume deletion in the tenant group is permitted is sent to the storage tenant management unit 11C. On the other hand, when the volume deletion in the tenant group is not permitted or when no record that satisfies the condition described above exists in the tenant group management table 1110, a response indicating that the tenant ID is a tenant ID for which the volume deletion in the tenant group is not permitted is sent to the storage tenant management unit 11C. The storage tenant management unit 11C can perform the determination of step S1023 based on the response received from the integrated tenant management unit 11A in this manner. As a result, when the volume deletion in the tenant group is permitted, the process proceeds to step S1024, otherwise, the process proceeds to step S1027.

In step S1024, in the storage 30, the allocation of the virtual target port associated with the LU designated as the deletion target is released.

In step S1025, the LU designated as the deletion target is deleted from the storage 30.

In step S1026, information of the LU deleted in step S1025 is deleted from the storage tenant and resource management table 1310.

In step S1027, an access right error is returned, as a response, to the manager who instructs the storage 30 to delete a volume.

After the process of step S1026 or S1027 is performed, the volume deletion process illustrated in the flowchart of FIG. 29 is ended.

Figure 30:
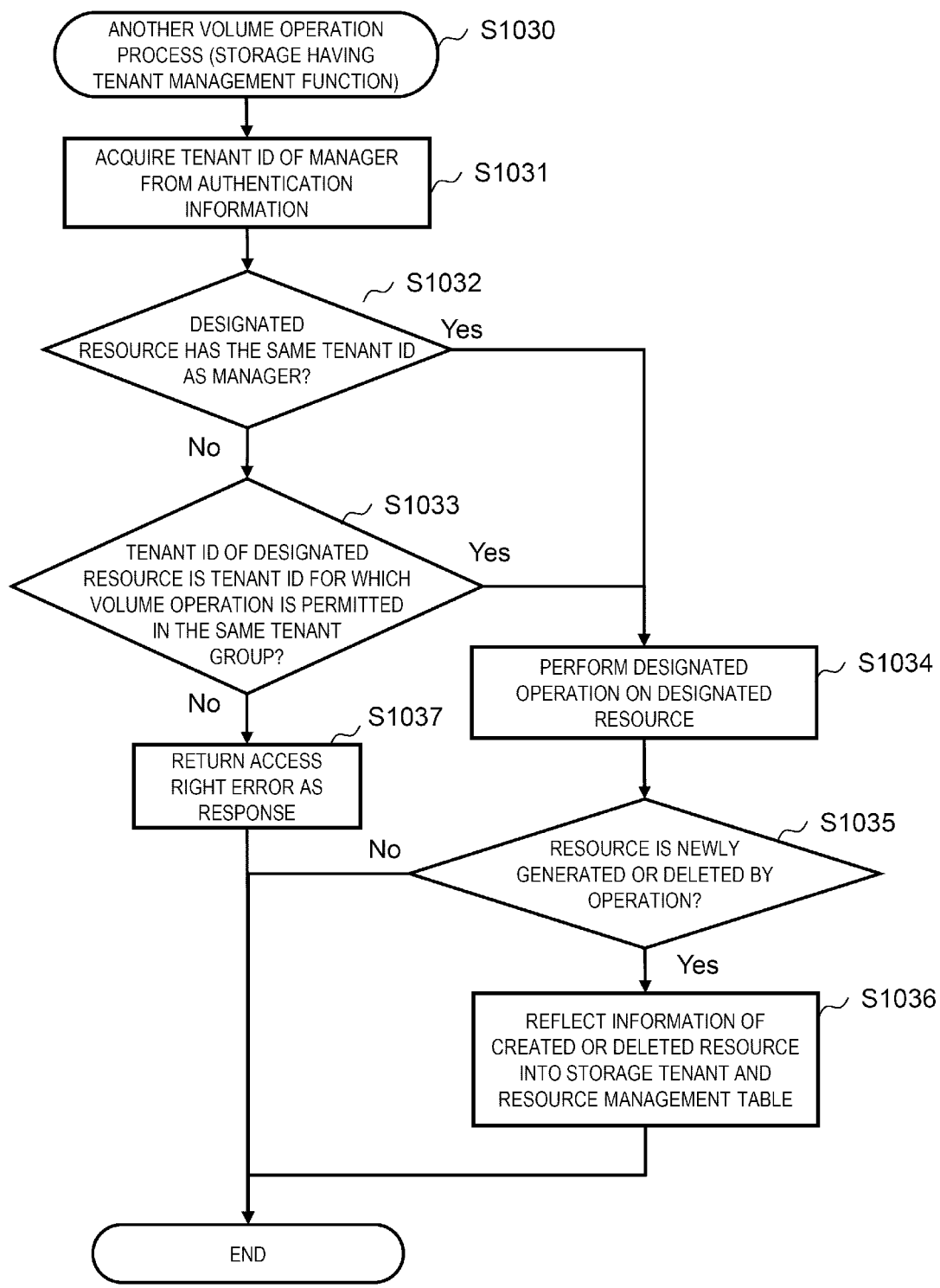
FIG. 30 is a flowchart of another volume operation process in a case of a storage having the tenant management function.

FIG. 30 is a flowchart of another volume operation process performed by the CPU 101 executing the volume operation program 1030 in a case where the storage 30 has the tenant management function.

When the volume operation process is started in step S1030, in step S1031, a tenant ID of a manager who instructs the storage 30 to perform a volume operation other than the volume creation and the volume deletion is acquired based on authentication information of the manager. Here, as in step S1011 of FIG. 28 or step S1021 of FIG. 29, it is possible to acquire, with reference to the storage tenant and manager management table 1300, the tenant ID of the manager who instructs the storage 30 to perform a volume operation.

In step S1032, it is determined whether a resource instructed to perform a volume operation in the storage 30 has the same tenant ID as the manager. Here, by the same method as in step S1012 of FIG. 28 or step S1022 of FIG. 29, it is possible to determine whether the resource instructed to perform a volume operation and the manager have the same tenant ID. As a result, when both have the same tenant ID, the process proceeds to step S1034, otherwise, the process proceeds to step S1033.

In step S1033, it is determined whether a tenant ID of the resource instructed to perform a volume operation in the storage 30 is a tenant ID for which the volume operation is permitted in the same tenant group as that of the manager. Here, for example, as in step S1013 of FIG. 28 or step S1023 of FIG. 29, it is inquired from the storage tenant management unit 11C to the integrated tenant management unit 11A, whether the tenant ID of the manager acquired in step S1031 and the tenant ID of the resource confirmed in step S1032 are tenant IDs for which the volume operation is permitted in the same tenant group. Upon receiving this inquiry, the integrated tenant management unit 11A refers to the tenant group management table 1110 and determines whether both tenant IDs are stored in the group belonging tenant ID 1112 of a certain record. When a record that satisfies such a condition exists, it is confirmed whether the volume operation in the tenant group is permitted with reference to the intra-group permission action 1114 of the record. As a result, when the volume operation in the tenant group is permitted, a response indicating that the tenant ID is a tenant ID for which the volume operation in the tenant group is permitted is sent to the storage tenant management unit 11C. On the other hand, when the volume operation in the tenant group is not permitted or when no record that satisfies the condition described above exists in the tenant group management table 1110, a response indicating that the tenant ID is a tenant ID for which the volume operation in the tenant group is not permitted is sent to the storage tenant management unit 11C. The storage tenant management unit 11C can perform the determination of step S1033 based on the response received from the integrated tenant management unit 11A in this manner. As a result, when the volume operation in the tenant group is permitted, the process proceeds to step S1034, otherwise, the process proceeds to step S1037.

In step S1034, in the storage 30, a designated operation is performed on the resource designated as an operation target.

In step S1035, it is determined whether a resource is newly created or deleted in the storage 30 by the operation of step S1034. When a resource is created or deleted, the process proceeds to step S1036. When no resource is created or deleted, the volume operation process illustrated in the flowchart of FIG. 30 is ended.

In step S1036, information of the resource created or deleted by the operation of step S1034 is reflected in the storage tenant and resource management table 1310.

In step S1037, an access right error is returned, as a response, to the manager who instructs the storage 30 to perform a volume operation.

After the process of step S1036 or S1037 is performed, the volume operation process illustrated in the flowchart of FIG. 30 is ended.

According to the embodiment of the invention described above, the following operations and effects are exerted.

(1) The computer system 1 includes a plurality of node clusters (K8s clusters 20) each configured by a combination of one or a plurality of K8s nodes 21 which are virtual machines or physical machines, the storage 30 storing data, and the tenant management unit 11 managing the plurality of K8s clusters 20 and the storage 30. The tenant management unit 11 creates, in the storage 30, a plurality of tenants that provide a volume for each of the plurality of K8s clusters 20 (FIG. 14). For each of the plurality of K8s clusters 20, the storage 30 permits the access from the K8s cluster 20 to a tenant corresponding to the K8s cluster 20 and prohibits the access from the K8s cluster 20 to a tenant not corresponding to the K8s cluster 20 (FIG. 21). As a result, it is possible to appropriately separate an available volume for each user in the computer system 1 that includes the plurality of K8s clusters 20 each of which is an aggregate of the K8s nodes 21.

(2) The tenant management unit 11 sets, in the storage 30, a tenant group by grouping any two or more tenants among the plurality of tenants, and defines the access authority in the tenant group for each K8s cluster 20 corresponding to each tenant belonging to the set tenant group (FIG. 16). For each of the plurality of K8s clusters 20, the storage 30 permits or prohibits, according to the access authority defined by the tenant management unit 11, the access from the K8s cluster 20 to each of other tenants belonging to the same tenant group as the tenant corresponding to the K8s cluster 20 (FIG. 21). As a result, it is possible to manage the available volume of each user in units of the tenant groups.

(3) The storage 30 includes a plurality of virtual target ports corresponding to the respective virtual machines or physical machines of the K8s nodes 21. The tenant management unit 11 manages the association between the K8s cluster 20 and the tenant using the tenant and storage target port management table 1200, which is a management table representing the association between the virtual target port and the tenant. As a result, it is possible to reliably manage the association between the K8s cluster 20 and the tenant.

(4) The tenant management unit 11 has a tenant deletion function for deleting the created tenant (tenant deletion program 910). As a result, it is possible to delete the unnecessary tenant and manage the tenants appropriately.

(5) As illustrated in FIGS. 1 to 5, the K8s node 21 is configured by a virtual machine or a bare metal computer. As a result, the computer system 1 according to the present invention can be constructed by any system configuration.

(6) The computer system 1 may include one or a plurality of K8s nodes 21, and may include the bare metal nodes 10 that are a plurality of computers connected to each other via the network 40. In this case, at least one of the plurality of bare metal nodes 10 includes the tenant management unit 11, and the storage 30 may be provided combining a plurality of storage devices 110 respectively mounted on the plurality of bare metal nodes 10 (FIGS. 1 and 7). In this way, the computer system 1 according to the invention can be constructed by combining a plurality of computers.

(7) The storage 30 may be connected to the K8s clusters 20 via the network 40 (FIGS. 2 to 5). As a result, the computer system 1 according to the invention can be constructed using the storage 30 having a hardware configuration different from that of the K8s clusters 20.

(8) The storage 30 may have the tenant management function for managing the tenants (storage tenant management unit 11C) (FIG. 6). Accordingly, it is possible to appropriately manage the tenants created in the storage 30.

The invention is not limited to the above embodiment, and can be implemented by using any component within a range not departing from the gist of the invention. For example, each process described with reference to FIGS. 14 to 30 may be implemented by hardware such as field-programmable gate array (FPGA) instead of the CPU 101.

The embodiments and modifications described above are merely examples, and the invention is not limited to these contents as long as the features of the invention are not impaired. Although various embodiments and modifications are described above, the invention is not limited to contents of these embodiments and medications. Other embodiments that are regarded within the scope of the technical idea of the invention are also included within the scope of the invention.

What is claimed is:

1. An information processing system that includes a plurality of bare metal nodes having a processor and a storage device, the information processing system comprising:
a plurality of node clusters operated on bare metal nodes and configured to execute a process;
a storage configured to process data that the node cluster receives from or outputs to the storage device; and
a management unit configured to manage the node cluster and the storage,
the plurality of node clusters, the storage, and the management unit operating on the processor, wherein
the management unit is configured to create a tenant and assign the node cluster and a resource of the storage to the tenant,
the node clusters operating on different bare metal nodes are capable of being assigned to the same tenant,
the node clusters operating on the same bare metal node are capable of being assigned to different tenants, each node cluster including a logical initiator port logically associated with the node cluster,
tenant information related to the tenant is associated with the initiator port used by the respective node cluster assigned to the tenant, and
the management unit is configured to
determine the tenant to which the node cluster is assigned from an ID of the initiator port of the node cluster when an access request is issued from the node cluster, and
determine whether access from the node cluster to the storage is possible based on the tenant to which the resource of the storage and the node cluster are assigned and permit or prohibit the access.

2. The information processing system according to claim 1, wherein
the storage includes a storage control program, a logic storage area that is associated with a physical storage area of the storage device and stores data, and a target port serving as an access target to be accessed by the node cluster, and
the storage is configured to assign the logic storage area and the target port to the tenant as the resource of the storage, and
in the decision whether the access is possible, it is determined whether the node cluster is permitted to login to the target port.

3. The information processing system according to claim 2, wherein
the logic storage area and the target port are assigned by the storage control program, and
a plurality of the logic storage areas and a plurality of the target ports, which are provided by the same storage control program, are capable of being assigned to different tenants.

4. The information processing system according to claim 3, wherein
the processor and a plurality of nodes connected to one another by a network are provided,
a plurality of the storage control programs are respectively installed in the plurality of nodes and the resource of the storage is assigned to each of the nodes, and
the resources of the storage for different nodes are capable of being assigned to the same tenant.

5. The information processing system according to claim 1, wherein
the management unit is configured to create tenant information in which the tenant, and the node cluster and the resource of the storage, which are assigned to the tenant, are stored in association with each other, and
the storage is configured to permit or prohibit, based on the tenant information, access of the node cluster.

6. The information processing system according to claim 1, wherein
the management unit is configured to
set a tenant group by grouping a plurality of the tenants, and
determine whether the access from the node cluster to the storage is possible based on the tenant group of the tenant to which the resource of the storage and the node cluster are assigned, and to permit or prohibit the access.

7. The information processing system according to claim 1, wherein
the management unit is configured to, when receiving a tenant creation request from the node cluster, create the tenant to which the node cluster and the resource of the storage are assigned, and to notify the node cluster of identification information of a target port serving as an access destination in the storage.

8. An information processing method, comprising:
a plurality of bare metal nodes having a processor operating as a plurality of node clusters configured to execute a process,
a storage configured to process data that the node cluster receives from or outputs to the storage device, and
a management unit configured to manage the node cluster and the storage; and
the management unit creating a tenant and assigning the node cluster and a resource of the storage to the tenant,
the node clusters operating on different bare metal nodes are capable of being assigned to the same tenant,
the node clusters operating on the same bare metal node are capable of being assigned to different tenants, each node cluster including a logical initiator port logically associated with the node cluster,
tenant information related to the tenant is associated with the initiator port used by the respective node cluster assigned to the tenant, and
the management unit is configured to
determine the tenant to which the node cluster is assigned from an ID of the initiator port of the node cluster when an access request is issued from the node cluster, and
determine whether access from the node cluster to the storage is possible based on the tenant to which the resource of the storage and the node cluster are assigned, and permit or prohibit the access.

* * * * *